US012374108B2

(12) United States Patent
Zablotskaia et al.

(10) Patent No.: US 12,374,108 B2
(45) Date of Patent: Jul. 29, 2025

(54) SYSTEM AND METHOD FOR UNSUPERVISED SCENE DECOMPOSITION USING SPATIO-TEMPORAL ITERATIVE INFERENCE

(71) Applicant: ROYAL BANK OF CANADA, Toronto (CA)

(72) Inventors: Polina Zablotskaia, Vancouver (CA); Leonid Sigal, Vancouver (CA); Andreas Steffen Michael Lehrmann, Vancouver (CA)

(73) Assignee: ROYAL BANK OF CANADA, Toronto (CA)

( * ) Notice: Subject to any disclaimer, the term of this patent is extended or adjusted under 35 U.S.C. 154(b) by 654 days.

(21) Appl. No.: 17/336,898

(22) Filed: Jun. 2, 2021

(65) Prior Publication Data
US 2021/0374416 A1    Dec. 2, 2021

Related U.S. Application Data

(60) Provisional application No. 63/033,641, filed on Jun. 2, 2020.

(51) Int. Cl.
*G06K 9/00* (2022.01)
*G06N 3/0442* (2023.01)
(Continued)

(52) U.S. Cl.
CPC ........... *G06V 20/41* (2022.01); *G06N 3/0442* (2023.01); *G06N 3/0455* (2023.01);
(Continued)

(58) Field of Classification Search
CPC ...... G06V 10/00; G06V 10/44; G06V 10/451; G06V 10/454; G06V 10/62; G06V 10/70;
(Continued)

(56) References Cited

U.S. PATENT DOCUMENTS 7,113,185 B2 * 9/2006 Jojic ................. G06T 7/215
382/173
2017/0161638 A1 * 6/2017 Garagic ................. G06N 7/01
(Continued)

OTHER PUBLICATIONS

Klaus Greff, Raphaël Lopez Kaufman, Rishabh Kabra, Nick Watters, Chris Burgess, Daniel Zoran, Loic Matthey, Matthew Botvinick, Alexander Lerchner, "Multi-Object Representation Learning with Iterative Variational Inference", arXiv, arXiv:1903.00450v2, May 2019, pp. 1-27 (Year: 2019).*

(Continued)

*Primary Examiner* — Eric Rush
(74) *Attorney, Agent, or Firm* — Norton Rose Fulbright Canada LLP

(57) ABSTRACT

Systems and methods for unsupervised multi-object scene decomposition that involve a spatio-temporal amortized inference model for multi-object video decomposition. Systems and methods involve a new spatio-temporal iterative inference framework to jointly model complex multi-object representations and the explicit temporal dependencies between the frames. Those dependencies improve overall quality of decomposition, encode information about object dynamics and can be used to predict future trajectories of each object separately. Additionally, the model can generate precise estimations and output data even without color information. The model has scene decomposition, segmentation and future prediction capabilities. The processor can use the model to simulate future frames of the scene data.

28 Claims, 20 Drawing Sheets

(51) Int. Cl.

| | | |
|---|---|---|
| *G06N 3/0455* | (2023.01) | |
| *G06N 3/0475* | (2023.01) | |
| *G06N 3/049* | (2023.01) | |
| *G06N 3/088* | (2023.01) | |
| *G06N 3/0985* | (2023.01) | |
| *G06N 5/04* | (2023.01) | |
| *G06N 20/00* | (2019.01) | |
| *G06V 10/62* | (2022.01) | |
| *G06V 10/778* | (2022.01) | |
| *G06V 10/82* | (2022.01) | |
| *G06V 10/84* | (2022.01) | |
| *G06V 10/86* | (2022.01) | |
| *G06V 20/40* | (2022.01) | |

(52) U.S. Cl.
CPC ........... *G06N 3/0475* (2023.01); *G06N 3/049* (2013.01); *G06N 3/088* (2013.01); *G06N 3/0985* (2023.01); *G06N 5/04* (2013.01); *G06N 20/00* (2019.01); *G06V 10/62* (2022.01); *G06V 10/778* (2022.01); *G06V 10/82* (2022.01); *G06V 10/84* (2022.01); *G06V 10/86* (2022.01); *G06V 20/49* (2022.01); *G06T 2207/10016* (2013.01); *G06T 2207/20076* (2013.01)

(58) Field of Classification Search
CPC ...... G06V 10/74; G06V 10/75; G06V 10/751; G06V 10/764; G06V 10/778; G06V 10/82; G06V 10/84; G06V 10/86; G06V 10/96; G06V 20/40; G06V 20/41; G06V 20/44; G06V 20/46; G06V 20/47; G06V 20/48; G06V 20/49; G06V 20/70; G06V 20/80; G06F 18/20; G06F 18/21; G06F 18/24; G06F 18/241; G06F 18/2413; G06F 18/2415; G06F 18/24155; G06F 18/26; G06F 18/27; G06F 18/28; G06F 18/29; G06N 3/04; G06N 3/044; G06N 3/0442; G06N 3/045; G06N 3/0455; G06N 3/0464; G06N 3/047; G06N 3/0475; G06N 3/049; G06N 3/08; G06N 3/084; G06N 3/088; G06N 3/0985; G06N 5/04; G06N 7/01; G06N 20/00; G06T 2207/10016; G06T 2207/20076; G06T 2207/20081; G06T 2207/20084
USPC ....... 382/100, 103, 155–160, 164, 165, 173, 382/181, 190, 195, 203, 224–227, 229, 382/232, 233, 238, 325; 706/15–21, 706/25–31, 53, 54; 348/121, 135, 169
See application file for complete search history.

(56) References Cited

U.S. PATENT DOCUMENTS

| | | | |
|---|---|---|---|
| 2019/0220691 A1* | 7/2019 | Valpola | G06F 18/214 |
| 2019/0311202 A1* | 10/2019 | Lee | G06V 10/774 |
| 2020/0160176 A1* | 5/2020 | Mehrasa | G06N 3/08 |

OTHER PUBLICATIONS

Rishi Veerapaneni, John D. Co-Reyes, Michael Chang, Michael Janner, Chelsea Finn, Jiajun Wu, Joshua Tenenbaum, Sergey Levine, "Object Abstraction in Visual Model-Based Reinforcement Learning", Workshop on Perception as Generative Reasoning, NeurIPS 2019, pp. 1-12 (Year: 2019).*

Emily Denton, Vighnesh Birodkar, "Unsupervised Learning of Disentangled Representations from Video", arXiv, arXiv:1705.10915v1, May 2017, pp. 1-13 (Year: 2017).*

Christopher P. Burgess, Loic Matthey, Nicholas Watters, Rishabh Kabra, Irina Higgins, Matt Botvinick, Alexander Lerchner, "MONet : Unsupervised Scene Decomposition and Representation", arXiv, arXiv:1901.11390v1, Jan. 2019, pp. 1-22 (Year: 2019).*

Adam R. Kosiorek, Hyunjik Kim, Ingmar Psner, Yee Whye Teh, "Sequential Attend, Infer, Repeat: Generative Modelling of Moving Objects", arXiv, arXiv:1806.01794v2, Nov. 2018, pp. 1-25 (Year: 2018).*

Rishi Veerapaneni, John D. Co-Reyes, Michael Chang, Michael Janner, Chelsea Finn, Jiajun Wu, Joshua B. Tenenbaum, Sergey Levine, "Entity Abstraction in Visual Model-Based Reinforcement Learning", arXiv, arXiv:1910.12827v5, May 2020, pp. 1-21 (Year: 2020).*

Martin Engelcke, Adam R. Kosiorek, Oiwi Parker Jones, Ingmar Posner, "Genesis: Generative Scene Inference and Sampling With Object-Centric Latent Representations", arXiv, arXiv:1907.13052v3, Feb. 2020, pp. 1-17 (Year: 2020).*

* cited by examiner

SYSTEM AND METHOD FOR UNSUPERVISED SCENE DECOMPOSITION USING SPATIO-TEMPORAL ITERATIVE INFERENCE

CROSS REFERENCE TO RELATED APPLICATION

The application claims priority to and the benefit of U.S. Provisional Patent Application No. 63/033,641 filed Jun. 2, 2020, the entire contents of which is hereby incorporated by reference.

FIELD

The improvements generally relate to the field of unsupervised machine learning and video decomposition.

INTRODUCTION

Unsupervised representation learning can alleviate the need for excessively large and fully labeled datasets that are currently required by most neural architectures. Representation learning approaches include unsupervised (e.g., auto-encoder-based) or self-supervised learning of holistic representations that, for example, are tasked with producing (spatial, temporal or color) predictive encodings for images or patches. Methods can utilize powerful transformer architectures coupled with proxy multi-modal tasks. There exists a need for improved approaches for learning of disentangled, spatially granular, representations and improved approaches that are able to decouple object appearance and shape, for complex visual scenes consisting of multiple moving object instances.

Attention-based methods can infer latent representations of each object in a scene. Iterative refinement models decompose a scene into a collection of components by grouping pixels. The former have been limited to latent representations at object (image patch)-level, while the latter class of models have illustrated ability for granular latent representations at the pixel (segmentation)-level. Specifically, refinement models learn pixel-level generative models, that arise from spatial mixture model perspectives, and utilize amortized iterative refinement for inference of disentangled latent representations within a variational autoencoder (VAE) formulation; an example is IODINE (Iterative Object Decomposition Inference Network). However, these approaches appear to be limited by the fact that they only consider images. Even when applied for inference in video data, these approaches process frames one at a time. This makes it excessively challenging to discover and represent individual instances of objects that may share properties such as appearance and shape, but differ in dynamics.

SUMMARY

Embodiments described herein relate to unsupervised video decomposition. Embodiments described herein relate to unsupervised multi-object scene decomposition. Embodiments described herein relate to unsupervised multi-object scene decomposition using spatio-temporal iterative inference. In accordance with an aspect, there is provided a system for unsupervised multi-object scene decomposition with at least one computing device. The system processes scene data to generate scene decomposition data. The system processes the inputs to each cell with the spatial broadcast decoder and a refinement network. The system receives scene data, such as raw video data, from video data sources, for example.

The processor can access the models stored in the memory to process the scene data to generate the scene decomposition data. The memory can store a spatio-temporal amortized inference model for multi-object video decomposition, for example. The processor accesses the memory to process the scene data using the spatio-temporal amortized inference model to generate scene decomposition data. The processor can use the model to simulate future frames of the scene data.

In some embodiments, the spatio-temporal amortized inference model has instructions for refinement steps and time steps ands a grid of cells, the cells having a first set of cells and a second set of cells, wherein each cell (r, t) of the first set of cells corresponds an r-th refinement at time t, wherein each cell of the second set of cells corresponds to a final construction with no refinement needed, wherein each cell of the first set of cells receives as input a previous refinement hidden state, a temporal hidden state, and posterior parameters, and generates as output a new hidden state and new posterior parameters.

In some embodiments, each cell of the first set of cells comprises a spatial broadcast decoder, a multilayer perceptron and a 2D long short term memory unit.

In some embodiments, the processor decomposes a video sequence into slot sequences and appearance sequences and introduces temporal dependencies into a sequence of posterior refinements for use during decoding with a generative model.

In some embodiments, the processor generates scene decomposition data comprising a graph or grid with a time dimension and a refinement dimension for the scene data using the spatio-temporal amortized inference model and a 2D long short term memory unit to capture a joint probability over a video sequence of the scene data.

In some embodiments, the spatio-temporal amortized inference model jointly models multi object representations and temporal dependencies between latent variables across frames of the scene data.

In some embodiments, the processor uses scene decomposition data to encode information about objects' dynamics, and predict trajectories of each object separately.

In some embodiments, the scene decomposition data provides multi-object representations to decompose a scene into a collection of objects with individual representations, where in each object is represented by a latent vector capturing the object's unique appearance and encoding visual properties comprising color, shape, position, and size, wherein a broadcast decoder generates pixelwise pairs corresponding to an assignment probability and appearance of a pixel for the object, wherein the processor induces a generative image formation model to construct image pixels.

In some embodiments, the processor uses the spatio-temporal amortized inference model by starting with estimated parameters for an approximate posterior and update the estimated parameters by a series of refinement operations, wherein each refinement operation samples a latent representation and uses an approximate posterior gradient to compute a new parameter estimate using a sequence of convolutional layers and a long short term memory unit that receives as input a hidden state from a previous refinement operation.

In some embodiments, the processor generates variational estimates from previous refinement steps and temporal information from previous frames of the scene data.

In some embodiments, the processor trains the model using a variational objective having a first term for a reconstruction error of a single frame and a second term for a divergence between a variational posterior and a prior, wherein a relative weight between both terms is controlled with a hyperparameter.

In some embodiments, the processor decomposes a static scene into multiple objects and represents each object by a latent vector capturing the object's unique appearance to encode visual properties, wherein, for each latent vector, a broadcast decoder generates pixelwise pairs of assignment probability and appearance of a pixel for an object, wherein the pixelwise pairs induce a generative image formation model, wherein original image pixels can be reconstructed from a probabilistic representation of the image formation model.

In some embodiments, the processor generates a parameter estimate for an approximate posterior and updates the parameter estimate over a series of refinement steps, wherein each refinement step samples a latent representation from the approximate posterior to evaluate an ELBO and uses gradients for the approximate posterior to compute the updated parameter estimate.

In some embodiments, the processor generates a parameter estimate, using a function of a sequence of convolutional layers and an long short term memory unit, wherein the long short term memory unit takes as input a hidden state from a previous refinement step.

In some embodiments, the scene data comprises disentangled, spatially granular representations of objects and wherein the processor generates, for the objects, scene inference data, segmentation data, and prediction data by processing the scene data.

In some embodiments, the scene data comprises complex visual scenes consisting of multiple moving object instances, wherein the processor uses the spatio-temporal amortized inference model to decouple object appearance and shape.

In some embodiments, the scene data comprises complex video data depicting multiple objects, wherein the processor uses the spatio-temporal amortized inference model to generate, for each of the multiple objects, object inference data, object segmentation data, and object prediction data.

In some embodiments, the scene decomposition data comprises scene inference data, segmentation data, and prediction data for objects of the scene data.

In some embodiments, the spatio-temporal amortized inference model captures refinement of an object over time.

In some embodiments, the spatio-temporal amortized inference model captures temporal dependencies between latent variables of the scene data across time.

In some embodiments, the scene data comprises video data, wherein the spatio-temporal amortized inference model captures temporal dependencies among frames in the video data.

In some embodiments, the spatio-temporal amortized inference model comprises a conditional prior for variational inference.

In some embodiments, the scene decomposition data comprises segmentation data defining segmentation of objects within the scene data, and wherein the processor infers the segmentation data of objects using interpretable latent representations to decompose each frame of the scene data and simulate future dynamics using an unsupervised process.

In some embodiments, the spatio-temporal amortized inference model uses unsupervised learning for multi-object scene decomposition to learn probabilistic dynamics of each object from complex raw video data by introducing temporal dependencies between the random latent variables at each frame.

In some embodiments, the memory stores the additional entropy prior and the processor accesses the memory to process the scene data using the additional entropy prior when object appearance is non-distinctive.

In some embodiments, the processor uses the model to estimate masks and dynamics of each object in the scene data and temporal dependencies between frames of the scene data.

In some embodiments, the system has a spatial broadcast decoder, multilayer perceptron and long short-term memory.

In some embodiments, the spatio-temporal amortized inference model comprises a refinement network.

In some embodiments, the processor uses the model to simulate future frames of the scene data.

In another aspect, there is provided a method for unsupervised multi-object scene video decomposition comprising: decomposing a video sequence of scene data into slot sequences and appearance sequences to introduce temporal dependencies into a sequence of posterior refinements; and generating scene decomposition data using a processor that accesses the memory storing a spatio-temporal amortized inference model and having a 2D long short term memory unit to capture a joint probability over the video sequence, the scene decomposition data having time data and refinement data for use during decoding with a generative model.

In another aspect, there is provided a non-transitory computer readable medium comprising instructions for unsupervised multi-object scene video decomposition, the instructions executed by a hardware processor to implement acts comprising: decomposing a video sequence of scene data into slot sequences and appearance sequences to introduce temporal dependencies into a sequence of posterior refinements; and generating scene decomposition data using a memory storing a spatio-temporal amortized inference model and having a 2D long short term memory unit to capture a joint probability over the video sequence, the scene decomposition data having time data and refinement data for use during decoding with a generative model.

Further features and combinations of various embodiments are described in this disclosure.

DETAILED DESCRIPTION

Figure 1A:
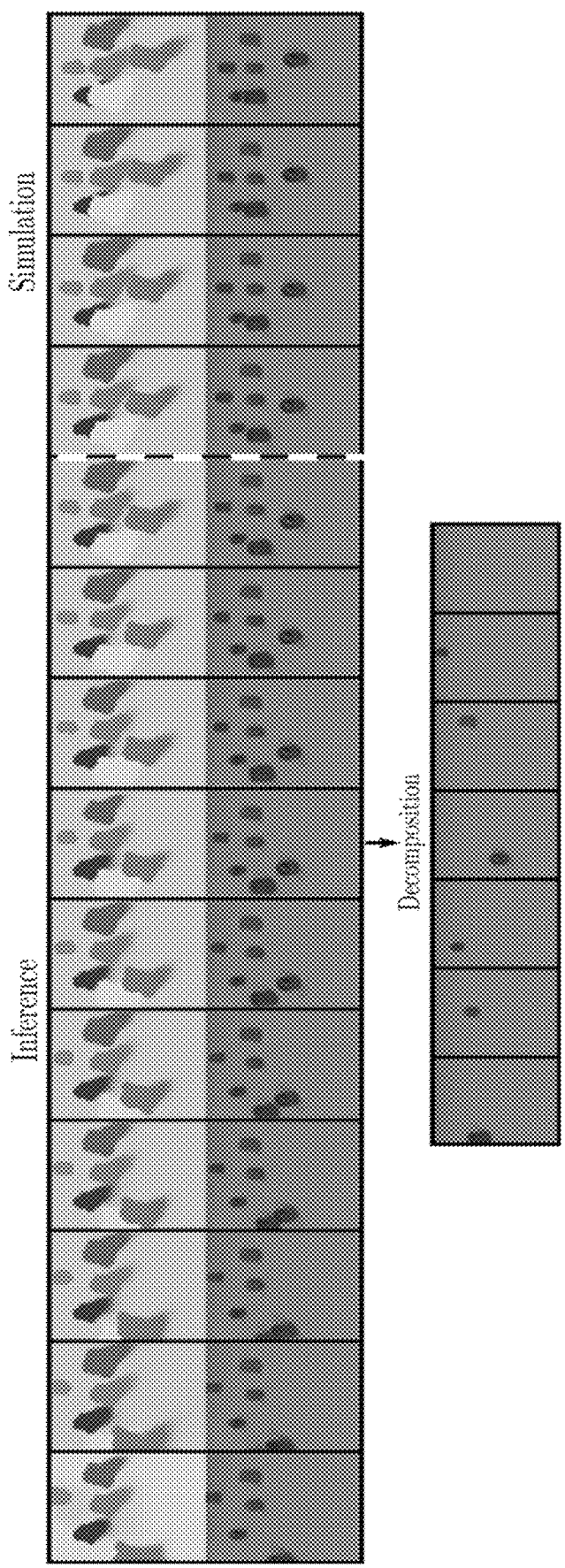
FIG. 1a shows an example of dynamic scene decomposition.

Unsupervised multi-object scene decomposition is a problem in representation learning. Models may be unable to leverage important dynamic cues present in videos. Embodiments described herein are directed to unsupervised framework for probabilistic video decomposition based on a temporal extension of iterative inference. Embodiments described herein can jointly model complex individual multiobject representations and explicit temporal dependencies between latent variables across frames. This can be achieved, for example, by leveraging two dimensional LSTM, temporally conditioned inference and generation within the iterative amortized inference for posterior refinement. For example, a method for unsupervised video decomposition can improve the overall quality of decompositions, encodes information about the objects' dynamics, and can be used to predict trajectories of each object separately. Additionally, the model can have high accuracy even without color information. Example experiments described herein show decomposition capabilities of example models and shows performance on benchmark datasets.

Decomposition describes the task of separating a scene into a collection of objects with individual representations. As an illustrative example, consider the break down of scenes into a set of blocks with their own properties. Intelligent vision system can learning to perceive the world as a collection of individual components (objects) with their own latent representations. Unsupervised learning of visual object representations is invaluable for extending the generality and interpretability of such models, enabling compositional reasoning and transferability. There is a need for learning rich video representations that, agnostic to occlusion and object quantities, can decouple object appearance and shape in complex visual scenes containing multiple moving objects.

In computer vision, motion provides data to systems for use in segmenting objects within scene data. Scene data can be video data, for example. Scene decomposition can also be referred to as multi-object video decomposition. Embodiments described herein can provide systems, devices, and processes for unsupervised video decomposition. Embodiments described herein can provide systems, devices, and processes for a spatio-temporal amortized inference model capable of unsupervised multi-object scene decomposition. The model can learn and leverage the implicit probabilistic dynamics of each object, from complex raw video alone. Embodiments described herein relate to methods and systems that introduce temporal dependencies between the latent variables across time. As such, embodiments described herein can use IODINE, or other example VAE formulations, as example spatial cases of spatio-temporal formulation. Modeling temporal dependencies among frames in the video or scene data also allows embodiments described herein to make use of conditional priors for variational inference, which, as a consequence, leads to more accurate and efficient inference results.

Figure 1B:
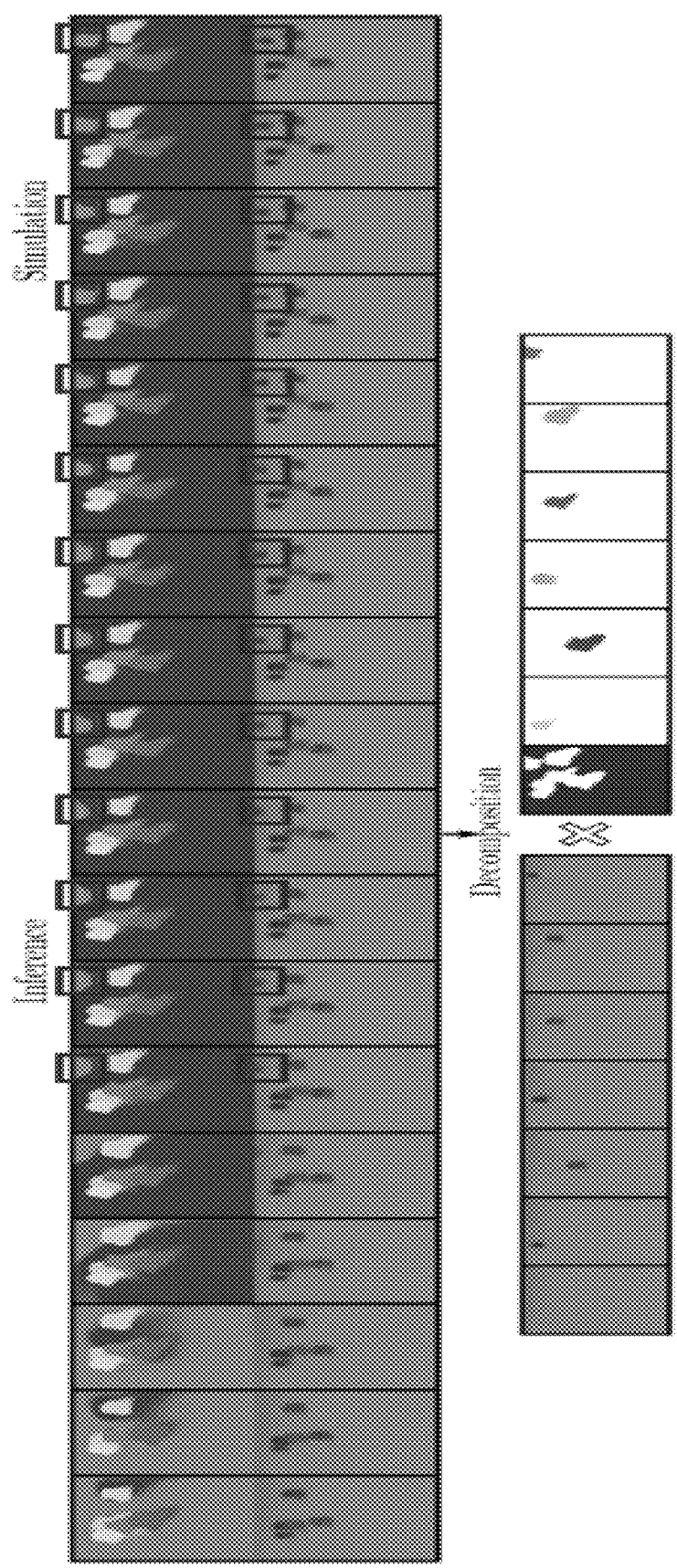
FIG. 1b shows an example of dynamic scene decomposition.

FIG. 1a and FIG. 1b show example visual representations of dynamic scene decomposition. Embodiments described herein can infer precise segmentations of the objects within video (or scene) data via interpretable latent representations, that can be used to decompose each frame and simulate the future dynamics using an unsupervised process. When a new object emerges into a frame, the system (programmed with the model) dynamically adapts and uses one of the segmentation slots to assign to the new object. The resulting model, illustrated in FIG. 1a and FIG. 1b as example visual representations, can achieve state of the art performance on complex multi-object public benchmarks with respect to different models.

Embodiments described herein provide a new spatio-temporal amortized inference model that is capable of multi-object video decomposition in an unsupervised manner. The spatio-temporal amortized inference model is also able to learn and model the probabilistic dynamics of each object from the complex raw video data by introducing temporal dependencies between the random latent variables at each frame. Embodiments described herein provide a system programmed with an improved spatio-temporal model.

The spatio-temporal model has a number of properties, including temporal extrapolation (prediction), computational efficiency and the ability to work with complex data exhibiting non-linear dynamics, colors and a changing number of objects within the same video sequence (objects exiting and entering the scene).

Embodiments described herein can introduce an additional entropy prior to improve the model's performance in scenarios where object appearance is non-distinctive (e.g. grey scale data). Embodiments described herein can process complex multi-object benchmark datasets (e.g. Bouncing Balls and CLEVRER) with improved results for segmentation, predictions and generalization.

Embodiments described herein provide systems and methods for unsupervised multi-object scene decomposition that involve a spatio-temporal amortized inference model for multi-object video decomposition. Embodiments described herein can provide improvements for representation learning, unsupervised learning, and video decomposition. The video data can include objects, 3D information for the object, and occlusions of the objects. The model can estimate the masks and the dynamics of each object. The model uses a spatio-temporal iterative inference framework that can jointly model complex multi-object representations and the explicit temporal dependencies between the frames. Those dependencies improve the overall quality of decomposition, encode information about the objects' dynamics and can be used to predict future trajectories of each object separately. Additionally, the model makes precise estimations even without color information. The model can be used to generate output data that corresponds to scene decomposition, segmentation and future prediction capabilities. The model can outperform other models on benchmark datasets.

For unsupervised scene representation learning, there can be attention based methods that infer latent representations of each object in a scene, and iterative refinement models that can make use of spatial mixtures and can decompose a scene into a collection of precisely estimated components by grouping pixels together. Models from the attention based methods, such as AIR and SPAIR decompose scenes into latent variables representing the appearance, position, and size of the underlying objects. Both methods can only infer an object's bounding boxes and have not been shown to work on colored data, 3D scenes, perspective distortions and occlusions. MoNet is an example of a model that can be used for instance segmentation of the objects and individual reconstructions; however it is not a proper probabilistic generative model and cannot perform density estimation. GENESIS extends MoNet to a probabilistic framework and also models spatial relations between the objects. Tagger is a first method example from the second category of models and it explicitly reasons about the segmentation of its inputs and features, however it does not allow explicit latent representations and does not scale to larger and more complex images. NEM extends Tagger and uses a spatial mixture model and Expectation Maximization framework. However it can only work with simple binary data. IODINE is an example of a model that employs iterative amortized inference and a spatial mixture model perspective. IODINE, unlike MoNet, is also a probabilistic model and can extend to sequential data.

For unsupervised video tracking and object detection, there are different example models such as SQAIR, SILOT and SCALOR that are temporal extensions of the static attention based models for tracking and object detection. SQAIR works only with simple binary data and does not go beyond bounding boxes estimations. SILOT and SCALOR can cope with cluttered scenes, larger numbers of objects and dynamic backgrounds, however, they still do not work on colored 3D data and do not produce high-quality segmentations. STOVE is another attention based model, however it mostly focuses on the physical learning and simulation side for simple synthetic datasets.

For unsupervised video decomposition and segmentation, there are models that use spatial mixtures and iterative inference in a temporal setting. For example, RTagger is a recurrent extension of Tagger that has the same limitations as its predecessor. This effectively learns objects' dynamics and interactions through a relational module and can produce segmentation but is limited to 2D binary data.

Non-representation learning methods do not employ representation learning for instance segmentation and object detection and rely on supervised methods instead: Mask R-CNN, Yolo V3 and Fast R-CNN are examples. An alternative way is to use hand-engineered features. Unsupervised video segmentation plays an important role in reinforcement learning. MOREL has taken an optical flow approach to segment the moving objects, while others use RL agents to infer segmentations.

Dynamic Video Decomposition

Embodiments described herein provide a dynamic model for unsupervised video decomposition or scene decomposition. A system or machine uses the dynamic model to process scene data to generate decomposition data, segmentation data, inference data, prediction data, and so on. The approach builds upon a generative model of multi-object representations and leverages elements of iterative amortized inference.

Multi-Object Representations

For multi-object representations (which can be in video data or scene data), the multi-object framework decomposes a static scene $x=(x_i)_i \in \mathbb{R}^D$ into K objects (including background). Each object is represented by a latent vector $z^{(k)} \in \mathbb{R}^M$ capturing the object's unique appearance. The vector can represent an encoding of common visual properties, such as color, shape, position, and size. For each $z^{(k)}$ independently, a broadcast decoder generates pixelwise pairs $(m_i^{(k)}, \mu_i^{(k)})$ describing the assignment probability and appearance of pixel i for object k. Together, they induce the generative image formation model:

$$p(x|z) = \Pi_{i=1}^D \Sigma_{k=1}^K m_i^{(k)} \mathcal{N}(x_i; \mu_i^{(k)}, \sigma^2), \quad (1)$$

where $z=(z^{(k)})_k$ and $\Sigma_{k=1}^K m_i^{(k)}=1$. The original image pixels can be reconstructed from this probabilistic representation as $\tilde{x}_i = \Sigma_{k=1}^K m_i^{(k)} \mu_i^{(k)}$.

Iterative Amortized Inference

Embodiments described herein leverage the iterative amortized inference framework, which uses machine learning to learn principles to close the amortization gap typically observed in traditional variational inference. The need for such an iterative process arises due to the multi-modality of Eq. (1), which results in an order invariance and assignment ambiguity in the approximate posterior that standard variational inference cannot overcome.

The amortized iterative inference can start with randomly guessed parameters $\lambda_1^{(k)}$ for the approximate posterior $q_\lambda(z_1^{(k)}|x)$ and update this initial estimate through a series of R refinement steps. Each refinement step $r \in \{1, \ldots, R\}$ involves samples of a latent representation from $q_\lambda$ to evaluate the evidence lower bound (ELBO) $\mathcal{L}$ and then uses the approximate posterior gradients $\nabla_\lambda \mathcal{L}$ to compute an additive update $f_\phi$, producing a new parameter estimate $$\lambda_{r+1}^{(k)}:$$

$$z_r^{(k)} \stackrel{k}{\sim} q_\lambda(z_r^{(k)}|x), \quad (2)$$

$$\lambda_{r+1}^{(k)} \stackrel{k}{\leftarrow} \lambda_r^{(k)} + f_\phi(a^{(k)}, h_{r-1}^{(k)}), \quad (3)$$

where $a^{(k)}$ is a function of $z_r^{(k)}$, x, $\nabla_\lambda \mathcal{L}$, and additional inputs. The function $f_\phi$ consists of a sequence of convolutional layers and an LSTM. The memory unit takes as input a hidden state $h_{r-1}^{(k)}$ from the previous refinement step.

Spatio-Temporal Iterative Inference

Figure 2A:
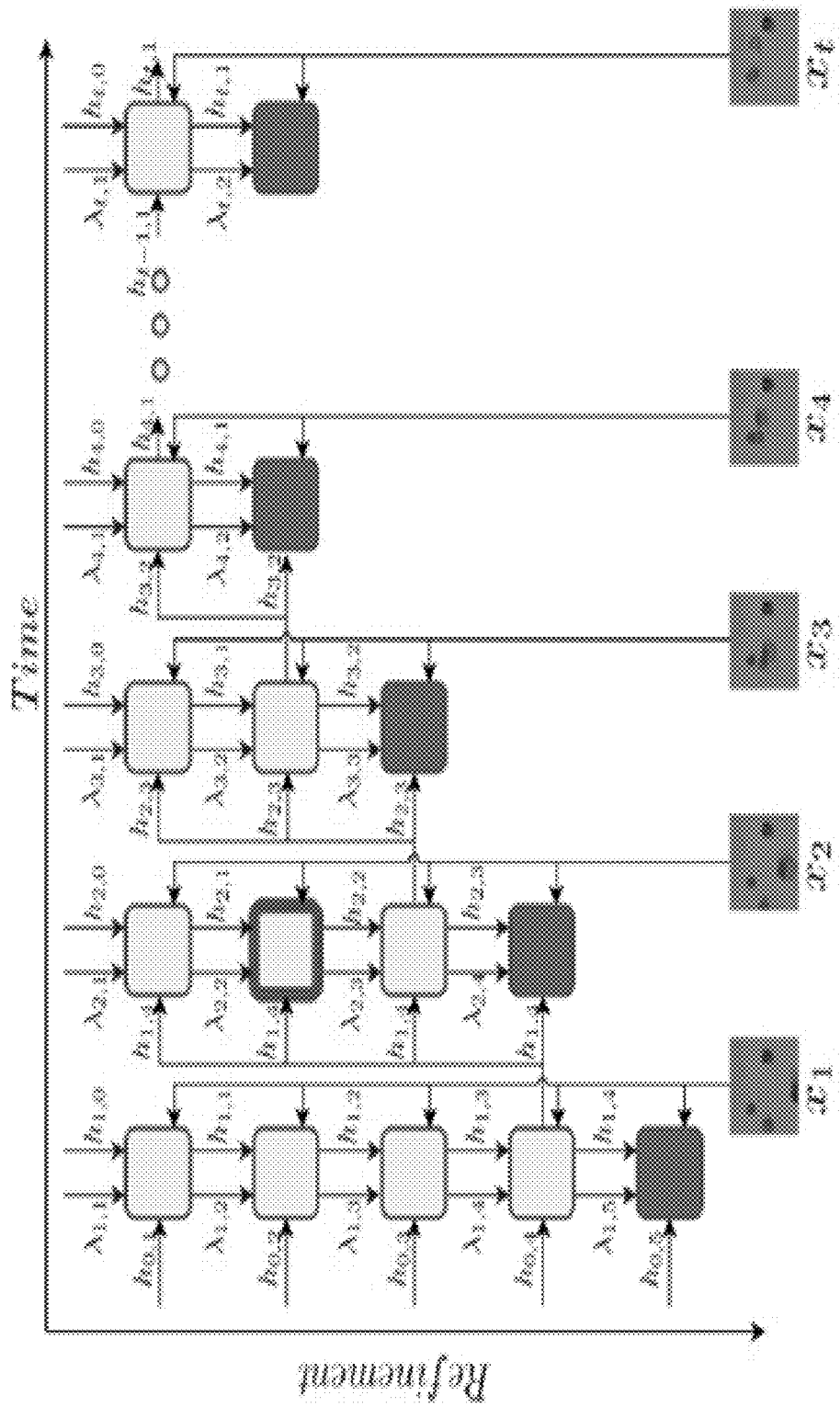
FIG. 2a shows a diagram of the model in a grid of refinement and time.

Embodiments described herein provide a model that enables robust learning of dynamic scenes through spatio-temporal iterative inference. Specifically, systems and methods use specific processors configured for the task of decomposing a video sequence $x=(x_t)_{t=1}^T=(x_{t,i})_{t,i=1}^{T,D}$ into K slot sequences $(m_t^{(k)})_t$ and K appearance sequences $(\mu_t^{(k)})_t$. The systems and methods introduce explicit temporal dependencies into the sequence of posterior refinements and leverage this contextual information during decoding with a generative model. The resulting computation graph can be data structures defining a 2D grid with time dimension t and refinement dimension r (FIG. 2a). Propagation of information along these two axes can be achieved with a 2D-LSTM (FIG. 2b), which allows modelling of the joint probability over the entire video sequence inside the iterative amortized inference framework. The method can model the multimodality of the image formation process and posterior, and yet, its complexity is smaller than that of its static counterpart.

FIG. 2a shows a diagram of the model in a grid of refinement and time. Inference in the model passes through a 2D grid in which cell (r, t) represents the r-th refinement at time t. Each cell receives three inputs: a refinement hidden state $h_{t,r-1}$, a temporal hidden state $h_{t-1,R}$, and posterior parameters $\lambda_{t,r}$. The outputs are a new hidden state $h_{t,r}$ and new posterior parameters $\lambda_{t,r+1}$.

Figure 2B:
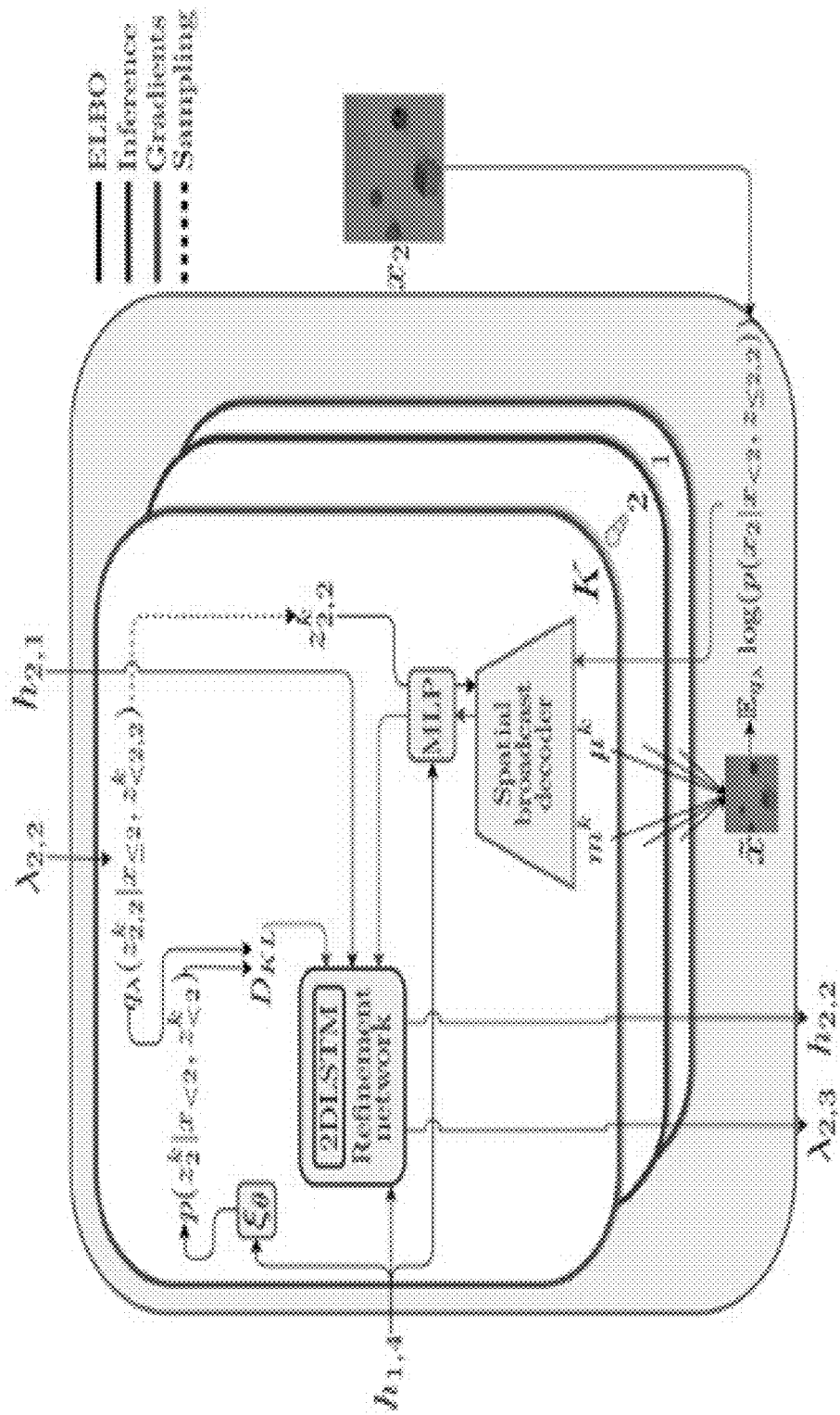
FIG. 2b shows an example of a system with a spatial broadcast decoder, multilayer perceptron and long short-term memory (LSTM).

FIG. 2b shows an example of a system with a spatial broadcast decoder, multilayer perceptron and long short-term memory (LSTM). The system can process the inputs to each cell with the help of a spatial broadcast decoder and a 2D LSTM.

Variational Objective

Since exact likelihood training is intractable, the system can define the task(s) as one or more variational objectives. In contrast to traditional optimization of the evidence lower bound (ELBO) through static encodings of the approximate posterior, embodiments described herein incorporate information from two dynamic axes: (1) variational estimates from previous refinement steps; (2) temporal information from previous frames. Together, they form the basis for spatio-temporal variational inference via iterative refinements. Specifically, systems and methods involve training the improved model by maximizing the following ELBO objective[1]:

$$\mathcal{L}_{ELBO}(x) = \mathbb{E}_{q_\lambda(z \leq T, R | x \leq T)} \Sigma_{t=1}^T \Sigma_{r=1}^R [\beta \log(p(x_t | x_{<t}, z_{\leq t,r})) - KL(q_\lambda(z_{t,r} | x_{\leq t}, z_{<t,r}) \| p(z_t | x_{<t}, z_{<t}))], \quad (4)$$

where the first term expresses the reconstruction error of a single frame and the second term measures the divergence between the variational posterior and the prior. The relative weight between both terms is controlled with a hyperparameter $\beta$. Furthermore, to reduce the overall complexity of the model and to make it easier to train, embodiments can set $\hat{R} := \max(R-t, 1)$. Compared to a static model, which infers each frame independently, reusing information from previous refinement steps makes the model more computationally efficient.

Inference and Generation

Embodiments described herein can involve conditional distributions, such as shown in Eq. (4).

Posterior Refinement

Embodiments described herein can involve optimizing Eq. (4) inside the iterative amortized inference framework. This requires consideration of the nature and processing of the hidden states. Propagation of a single signal, including different types of recurrent neural For simplicity, we drop references to the object slot*[(k)] from now on and formulate all equations on a per-slot basis. networks (RNNs) and transformers, involves different considerations in determining a solution for multiple axes with different semantic meaning (i.e., time and refinements).

Embodiments described herein can use a 2D version of the uni-directional MD-LSTM to compute our variational objective (Eq. (4)) in an iterative manner. Embodiments described herein replace the traditional LSTM in the refinement network (Eq. (3)) with a 2D extension. This extension allows the posterior gradients to flow through both the grid of the previous refinements and the previous time steps (see FIG. 2a). Writing $z_{t,r}$ for the latent encoding at time t and refinement r, embodiments described herein involve improved update schemes:

$$z_{t,r} \sim q_\lambda(z_{t,r} | x_{\leq t}, z_{<t,r}), \quad \lambda_{t,r+1} \leftarrow \lambda_{t,r} + f_\phi(a, h_{t,r-1}, h_{t-1,\hat{R}}). \quad (5)$$

Note that the hidden state from the previous time step is $h_{t-1,\hat{R}}$, i.e., the hidden state computed during the final refinement $\hat{R}$ at time t−1. The reasoning for this is that the approximation of the posterior only improves with the number of refinements.

Temporal Conditioning.

Inside the learning objective, embodiments described herein set the prior and the likelihood to be conditioned on the previous frames and the refinement steps. Each frame is dependent on the predecessor's dynamics and therefore, latent representations should follow the same property. Conditioning on the refinement steps provides an iterative amortized inference procedure. To model the prior and the likelihood distributions accordingly, the systems and methods use an iterative amortized inference setting. Specifically, the parameters of the Gaussian prior can be computed from the temporal hidden state $h_{t-1,\hat{R}}$:

$$p(z_t | x_{<t}, z_{<t}) = \mathcal{N}(z_t; \hat{\mu}_t, \text{diag}(\hat{\sigma}_t^2)), [\hat{\mu}_t, \hat{\sigma}_t] = \xi_\theta(h_{t-1,\hat{R}}), \quad (6)$$

where $\xi_\theta$ is a simple neural network with a few layers. In practice, $\xi_\theta$ predicts $\log \sigma_t$ for stability reasons. Note that the prior only changes along the time dimension and is independent of the refinement iterations, because the systems and methods refine the posterior to be as close as possible to the dynamic prior for the current time step. In this example, likelihood is a Gaussian mixture model, and now the object slot $\bullet^{(k)}$ is being explicitly referenced. Finally, to complete the conditional generation, systems and methods modify the likelihood distribution as follows:

$$p(x_t | x_{<t}, z_{\leq t}) = \Pi_{i=1}^D \Sigma_{k=1}^K m_{t,r,i}^{(k)} \mathcal{N}(x_{t,i}; \mu_{t,r,i}^{(k)}, \sigma^2), \\ [m_{t,r,i}^{(k)}, \mu_{t,r,i}^{(k)}] = g_\theta(z_{t,r}^{(k)}, h_{t-1,\hat{R}}^{(k)}), \quad (7)$$

where $\mu_{t,r,i}^{(k)}, m_{t,r,i}^{(k)}$ are mask and appearance of pixel i in slot k at time step t and refinement step r. $g_\theta$ is a spatial mixture broadcast decoder with preceding (multilayer perceptrons) MLP to transform the pair $(z_{t,r}^{(k)}, h_{t-1,\hat{R}}^{(k)})$ into a single vector representation.

Learning and Prediction

Systems and methods use different architectures for learning and prediction. Systems and methods involve an architecture that follows the optimization of a spatio-temporal ELBO objective (Eq. (4)) via iterative amortized inference. From a graphical point of view, the refinement steps and time steps can be organized by the system on a 2D grid, with cell (r, t) representing the r-th refinement at time t. In accordance with Eq. (5), each such cell takes as input the hidden state from a previous refinement $h_{t,r-1}$, the temporal hidden state $h_{t-1,\hat{R}}$, and the posterior parameters $\lambda_{t,r}$. The outputs of each cell are new posterior parameters $\lambda_{t,r+1}$ and a new hidden state $h_{t,r}$. During the last refinement $\hat{R}$ at time t, the value of the refinement hidden state $h_{t,r}$ is assigned to a new temporal hidden state $h_{t,\hat{R}}$. The initial values of hidden states and posterior parameters are set to zero and standard normal, respectively. FIG. 2a provides a high-level illustration of this view.

Systems and methods use different training objectives. Instead of a direct optimization of Eq. (4), systems and methods can use modifications to improve our model's practical performance. An example modification considers color as an important factor for high-quality segmentations. In the absence of such information, systems and methods can mitigate the arising ambiguity by maximizing the entropy of the masks $m_{t,r,i}^{(k)}$ along the slot dimension k, i.e., train the model by maximizing the objective $$\mathcal{L}_{ELBO} + \gamma \Sigma_{i=1}^D \Sigma_{k=1}^K m_{t,r,i}^{(k)} \log(m_{t,r,i}^{(k)}), \quad (8)$$

where $\gamma$ defines the weight of the entropy loss. As expected, the effect of the second term is most pronounced with binary data, so we set $\gamma=0$ in all experiments with RGB data.

As another modification in addition to the entropy loss, systems and methods can also prioritize later refinement steps by weighting the terms in the inner sum of Eq. (4) with $$\frac{r}{\hat{R}}.$$

Prediction

On top of video decomposition, the model is also able to simulate future frames $x_{T+1}, \ldots, x_{T+T'}$. Because our model requires image data $x_t$ as input, which is not available during synthesis of new frames, systems and methods can use the reconstructed image $\tilde{x}_t$ in place of $x_t$ to compute the likelihood $p(x_t|x_{<t}, z_{\leq t,r})$ in these cases. Systems and methods can also set the gradients $\nabla_\lambda \mathcal{N}$, $\nabla_\mu \mathcal{N} L$, and $\nabla_m \mathcal{N}$ to zero. The experimental results show that the information carried by the temporal hidden state is powerful enough to simulate>10 frames.

Complexity

The model's ability to reuse information from previous refinements leads to a runtime complexity of $\mathcal{O}(R^2+T)$, which is much more efficient than the $\mathcal{O}(RT)$ complexity of the traditional IODINE model (when each frame is inferred independently) in the typical case of T>>R.

Example Experiments

Example experiments were conducted on two datasets. The Bouncing Balls dataset contains sequences of 64×64 binary images over 50 timesteps that simulate balls with different masses bouncing elastically against each other and the image window. The experiment involves training the model on 40 timesteps and 50K videos with 4 balls in each frame, and testing the model on 10K videos of 4 balls and 10K videos of 6, 7, 8 balls, depending on the type of the experiment with a different number of timesteps.

Another example dataset is the modified CLEVRER. The dataset contains synthetic videos of moving and colliding objects. Each video is 5 seconds long and contains 128 frames with resolution 480×320, which the system can slice and then scale to 64×64 frames. For training, the system can use the same 10K videos as in the original source and set the number of slots of our model to 6 for all videos. For the test data, the system preprocess the validation data using the provided annotations to limit the number of static frames per video and compute the ground truth masks. The test for the system can be on 2.5K videos of 3, 4 and 5 objects with 6 slots and on 1.1K videos of 6 objects with 7 slots.

The training procedure is done by gradually increasing the number of frames per video. This can make optimisation more stable. The process can start with sequences of length 4 and training the model until there is no observation of further decrease in the loss or the posterior collapsing. The experiment starts with the batch size 32, and decreases it proportionally to sequence lengths.

The example experiment compares R-NEM and IODINE. R-NEM is the state of the art model for unsupervised video scene decomposition and learning objects dynamics. Despite showing very strong results on a simulation task, it fails to cope with any colored or 3D scenes. IODINE can be an appropriate model for the baseline, since the framework is built upon it. Note that IODINE is a static model and it does not explicitly incorporate scene dynamics into probabilistic framework. Another example is sequential IODINE.

Evaluation Metrics

There can be different evaluation metrics. The following describes example evaluation metrics.

Adjusted Rand Index (ARI) is a measure of clustering similarity and is computed by considering all pairs of samples and counting pairs that are assigned in the same or different clusters in the predicted and true clusterings. It ranges from 0 (chance) to 1 (perfect clustering). Each pixel is treated as one point and its segmentation as cluster assignment.

Adjusted Rand Index (ARI) without background is a modification of the ARI score, where the background pixels are ignored. It is important to compute both metrics, since the background takes at least 50% of the image space; therefore, ignoring it helps to more fairly assess segmentation within each object.

Embodiments described herein can compute Mean Squared Error (MSE) between the raw pixels of the recontacted frames $\hat{x}$ and the ground truth x.

Scene Decomposition Results

Table 1 shows the metric scores for the scene decomposition task for an example experiment. For the Bouncing Balls dataset, the models are tested on four different sequence lengths. The model and IODINE are also tested to behave if the balls are colored. As can be seen from the table, the method, accordingly to embodiments described herein outperforms the baselines with or without color information; however, access to the color certainly improves the model performance. R-NEM shows an increase of the performance with the number of frames per sequence, which can be caused by very poor results in the beginning of a sequence, while our model does not suffer from that issue. There can be recomption of the R-NEM ARI using weighted scores for the first frames, or there can be unweighted scores, for example. Since R-NEM does not work with colored data and 3D scenes, the comparison with IODINE is on the CLEVRER dataset. For both datasets, IODINE results are computed independently for each frame on 40 frame sequences. By treating each frame separately, IODINE does not keep the same object-slot assignment, which is a drawback; however, this can be deliberately ignored when computing the scores.

Table 1 herein shows quantitative evaluation of scene decomposition. The experiment shows a capability of the model to produce instance segmentations by decomposing scenes into groups of pixels. For the Bouncing Balls dataset, the models were tested on sequences of four balls and on two types of data: binary and colored. Since R-NEM does not work with color it is not present in the baselines. For CLEVRER dataset we tested on sequences of 3, 4 and 5 objects.

TABLE 1

| | | Quantitative evaluation of scene decomposition | | | | | | | | | | | |
|---|---|---|---|---|---|---|---|---|---|---|---|---|---|
| | | ARI (↑) | | | | ARI w/o bg (↑) | | | | MSE(↓) | | | |
| Length | | 10 | 20 | 30 | 40 | 10 | 20 | 30 | 40 | 10 | 20 | 30 | 40 |
| | | | | | | Bouncing Balls | | | | | | | |
| R-NEM | binary | 0.503 | 0.622 | 0.862 | 0.68 | 0.625 | 0.733 | 0.771 | 0.789 | 0.0252 | 0.0138 | 0.0096 | 0.0076 |
| IODINE | | 0.0318 | | | | 0.9986 | | | | 0.0018 | | | |
| SEQ-IODINE | | 0.0230 | ? | ? | ? | 0.8645 | ? | ? | ? | 0.0385 | ? | ? | ? |
| Our | | 0.7169 | 0.7263 | 0.7286 | 0.7294 | 0.9999 | 0.9999 | 0.9999 | 0.9999 | 0.0004 | 0.0004 | 0.0004 | 0.0004 |
| IODINE | color | 0.5841 | | | | 0.0752 | | | | 0.0014 | | | |

TABLE 1-continued

Quantitative evaluation of scene decomposition

| | | ARI (↑) | | | | ARI w/o bg (↑) | | | | MSE(↓) | | | |
|---|---|---|---|---|---|---|---|---|---|---|---|---|---|
| Length | | 10 | 20 | 30 | 40 | 10 | 20 | 30 | 40 | 10 | 20 | 30 | 40 |
| SEQ-IODINE | | 0.3789 | 0.3743 | 0.3225 | 0.2654 | 0.7517 | 0.8159 | 0.7537 | 0.6734 | 0.0160 | 0.0164 | 0.0217 | 0.0270 |
| Our | | 0.7275 | 0.7291 | 0.7289 | 0.7301 | 1.0000 | 1.0000 | 0.9999 | 0.9999 | 0.0002 | 0.0002 | 0.0002 | 0.0002 |
| | | | | | | CLEVRER | | | | | | | |
| IODINE | color | | 0.1791 | | | | 0.0316 | | | | 0.0064 | | |
| SEQ-IODINE | | 0.1171 | 0.1378 | 0.1558 | 0.1684 | 0.8520 | 0.8774 | 0.8780 | 0.8759 | 0.0009 | 0.0009 | 0.0010 | 0.0010 |
| Our | | 0.2220 | 0.2403 | 0.2555 | 0.2681 | 0.9182 | 0.9258 | 0.9309 | 0.9309 | 0.0003 | 0.0003 | 0.0003 | 0.0003 |

Generalization

This experiment shows how the model can adapt to datasets with a different number of objects. The performance of the model on the Bouncing Balls dataset with 6 to 8 objects and on the CLEVRER dataset with 6 objects has been evaluated.

Figure 3:
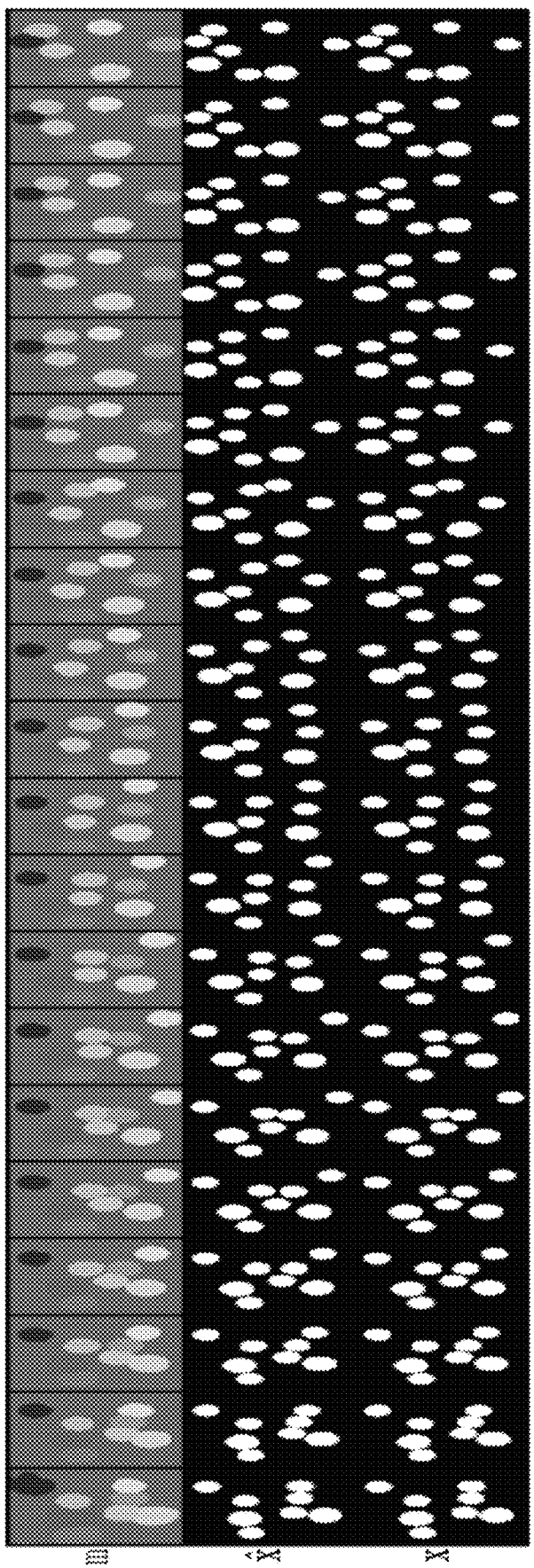
FIG. 3 shows results of an example dataset.
Figure 4:
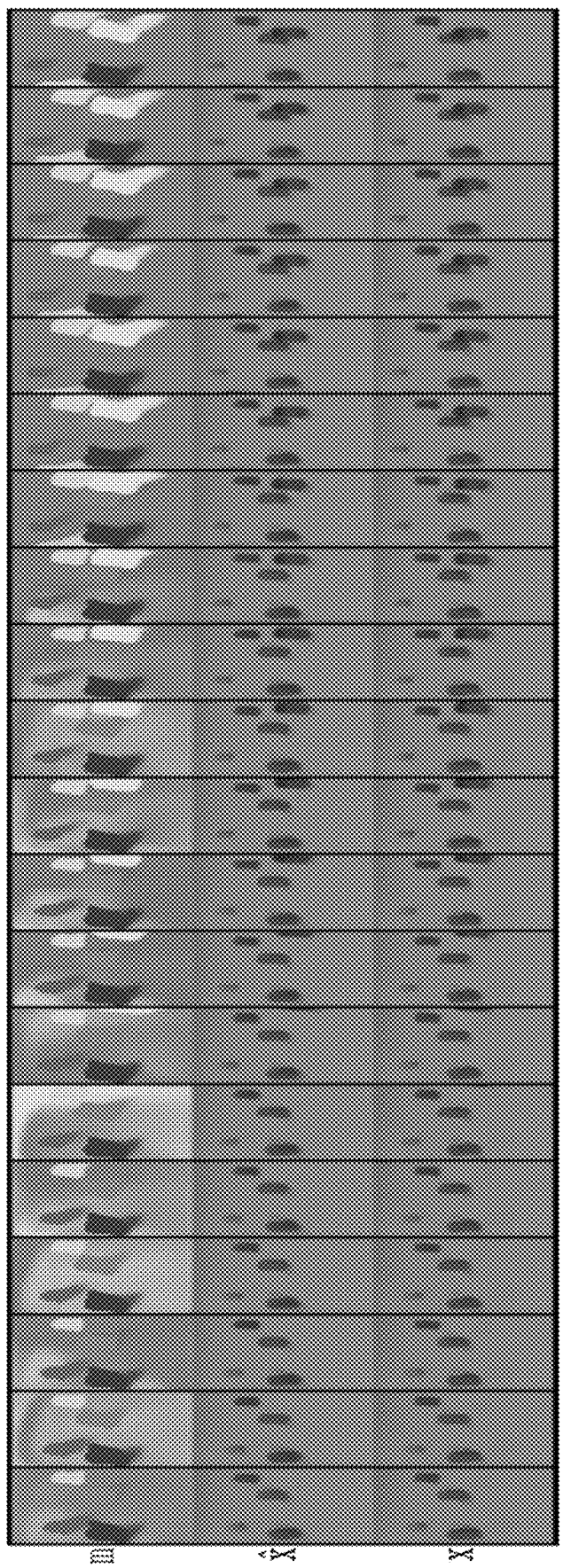
FIG. 4 shows results of another example dataset.

Table 2 shows the superiority comparison of the model of embodiments described herein to the baselines. Despite having a marginally worse ARI score compared to R-NEM, the model still outperforms the baseline on ARI without background and MSE. For the Bouncing Ball dataset, the effect of color on the performance has also been investigated. Since the model was tested on 6 to 8 balls, the test is on the same 4 colors as from the test data or on a new additional colors previously unseen. The MSE scores were significantly different for these two versions of the dataset, mainly because the model couldn't reconstruct the unseen colors, however it was still able to achieve high scores on other two metrics. FIGS. 3 and 4 demonstrate qualitative results. For more qualitative results for this and other experiments, please refer to the supplemental material.

Table 2 shows example results from a generalization experiment. To test how well models can adapt to a higher number of objects, the number of slots in the models was changed from 5 to 9 in the Bouncing Balls dataset, and from 6 to 7 slots in the CLEVRER dataset. The tests were done on videos of 6, 7, 8 balls and 6 objects.

TABLE 2

Generalization experiment.

| | | ARI (↑) | F-ARI(↑) | MSE (↓) |
|---|---|---|---|---|
| | | Bouncing Balls | | |
| binary | R-NEM | 0.4484 | 0.6377 | 0.0328 |
| | IODINE | 0.0271 | 0.9969 | 0.0040 |
| | SEQ-IODINE | 0.0263 | 0.8874 | 0.0521 |
| | PROVIDE | 0.4453 | 0.9999 | 0.0008 |
| color | IODINE (4) | 0.4136 | 0.8211 | 0.0138 |
| | IODINE (8) | 0.2823 | 0.7197 | 0.0281 |
| | SEQ-IODINE (4) | 0.2068 | 0.5854 | 0.0338 |
| | SEQ-IODINE (8) | 0.5271 | 0.5231 | 0.0433 |
| | PROVIDE (4) | 0.4275 | 0.9998 | 0.0004 |
| | PROVIDE (8) | 0.4317 | 0.9900 | 0.0114 |
| | | CLEVRER | | |
| color | IODINE | 0.2205 | 0.9305 | 0.0006 |
| | SEQ-IODINE | 0.1482 | 08645 | 0.0012 |
| | PROVIDE | 0.2839 | 0.9355 | 0.0004 |

Prediction

Embodiments described herein can provide a model that makes predictions about the future objects' dynamics, after several steps of learning. R-NEM and the model were ran on 20 normal steps, followed by 10 predicted frames according to a simulation protocol. Plots from FIG. 5a demonstrate the prediction curves for different numbers of simulated frames on the Bouncing Balls dataset. The results show that the model is superior to R-NEM on shorter sequences; however, for the longer sequences, the model consistently outperforms R-NEM only on colored data. The plot in FIG. 5b shows combined results for all scores on the CLEVRER dataset for the model. As shown in the plot, quality of the prediction slightly decreases with number of frames, however, the results indicate that the model can learn and approximate the object's dynamics.

Figure 5A:
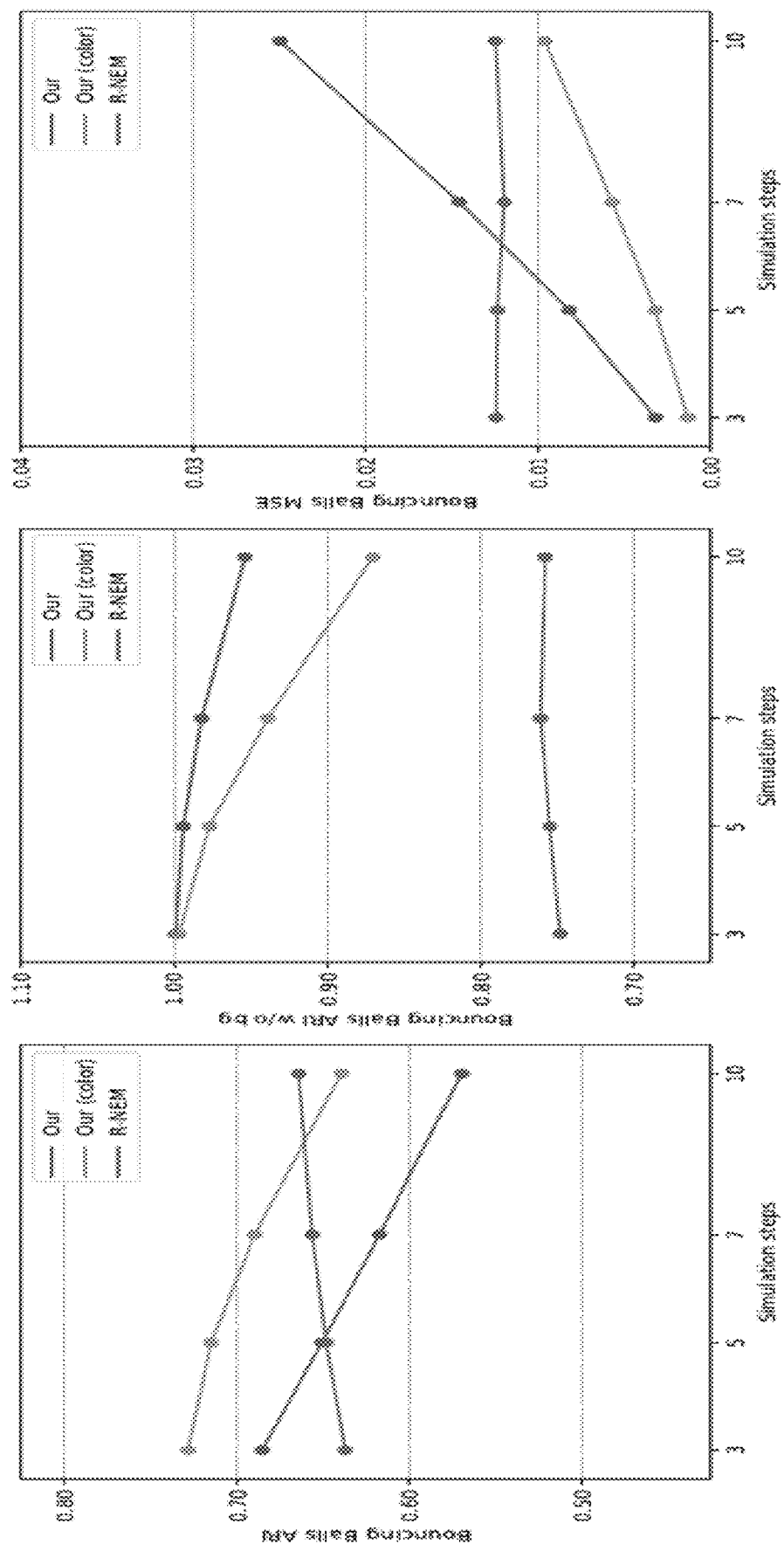
FIG. 5a and FIG. 5b show example quantitative results for a prediction experiment.
Figure 5B:
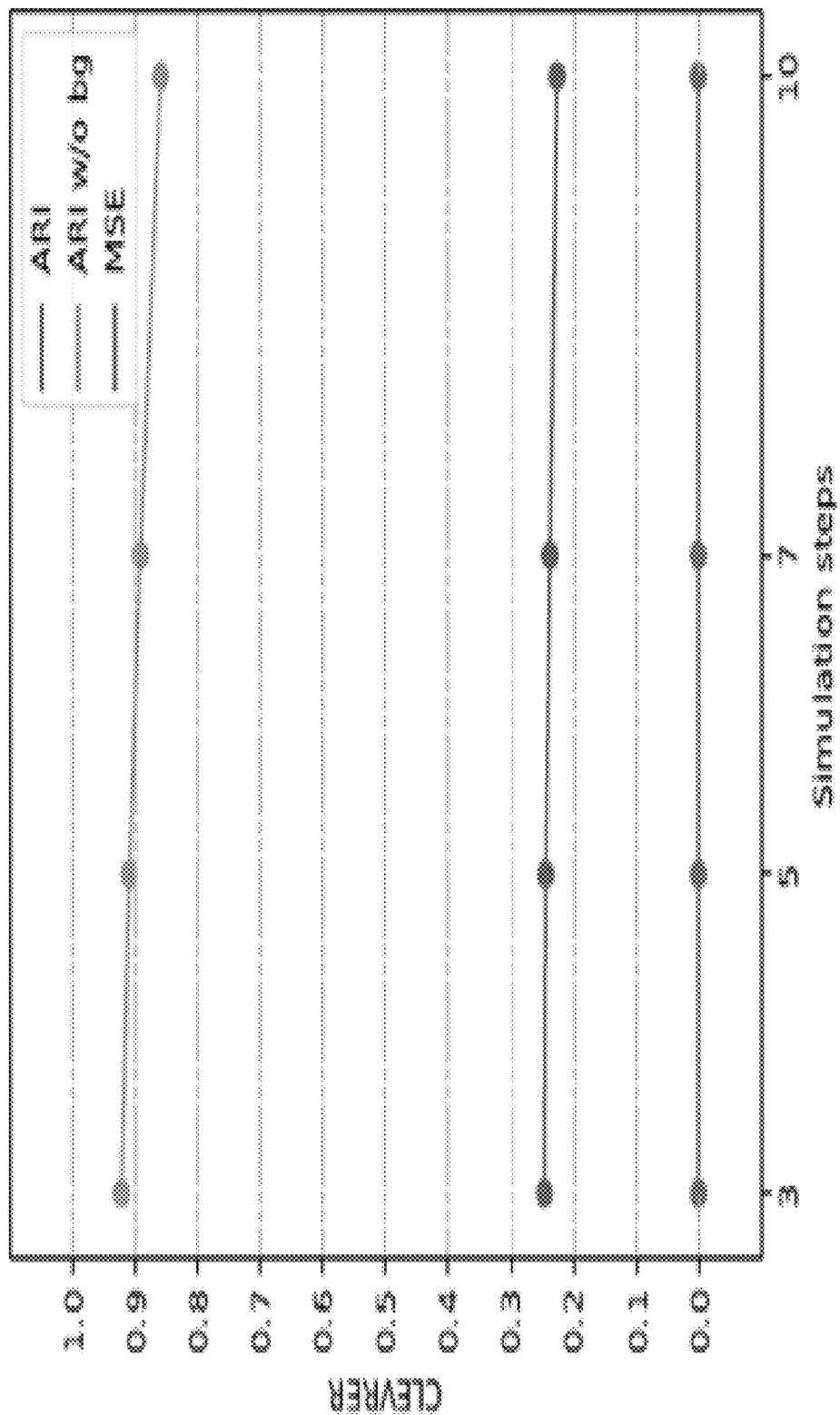
Figure 5C:
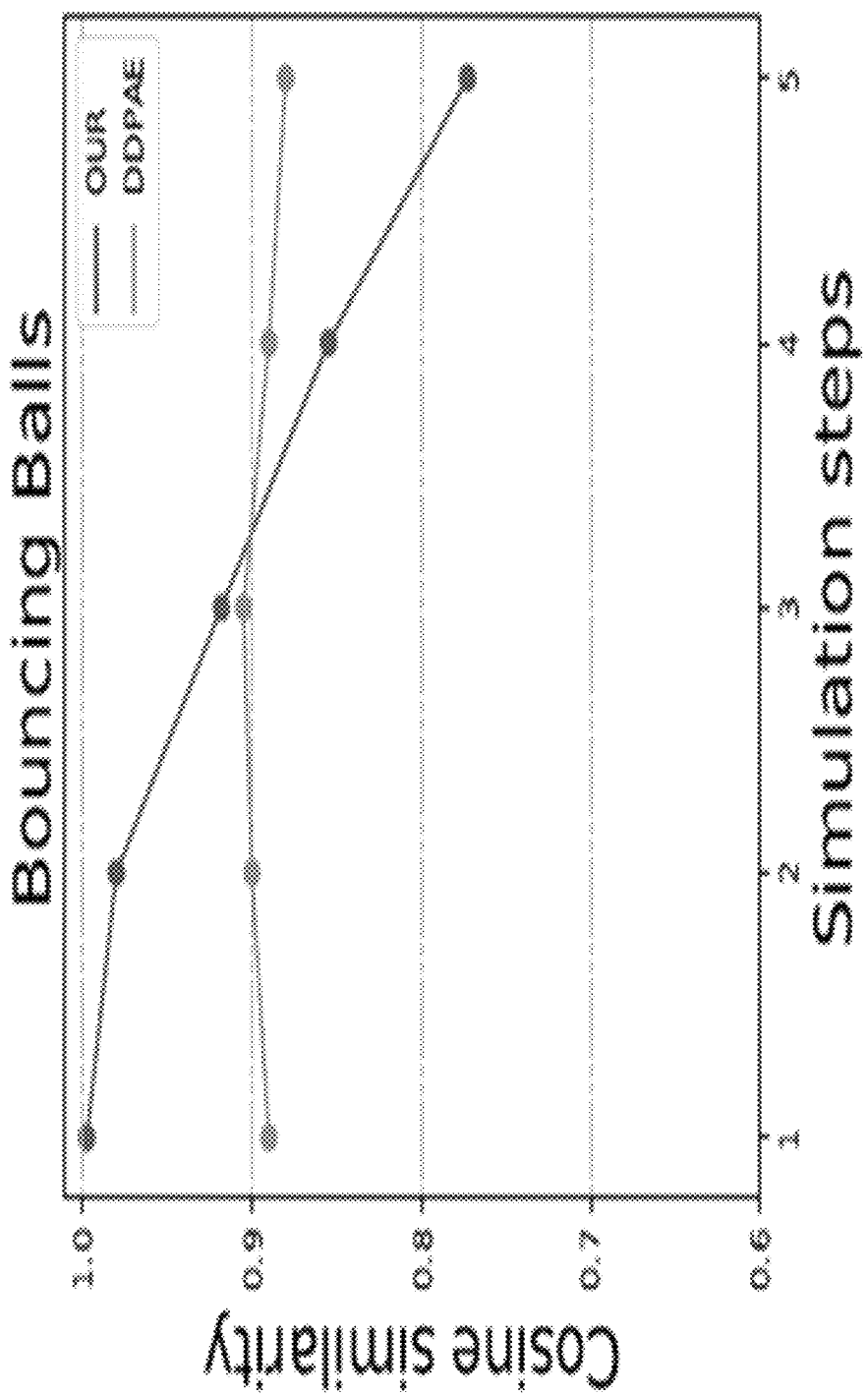
FIG. 5c shows example quantitative results for a velocity prediction experiment.

FIG. 5c shows example quantitative results for a velocity prediction experiment. In this example experiment, the velocity vectors between bounding box centroids are computed and the cosine similarity is compared to the predictions of DDPAE on the Bouncing Balls dataset. The systems and methods outperforms DDPAE on the first three frames and then declines in quality. This behavior is in line with the results shown in FIG. 5d.

Figure 5D:
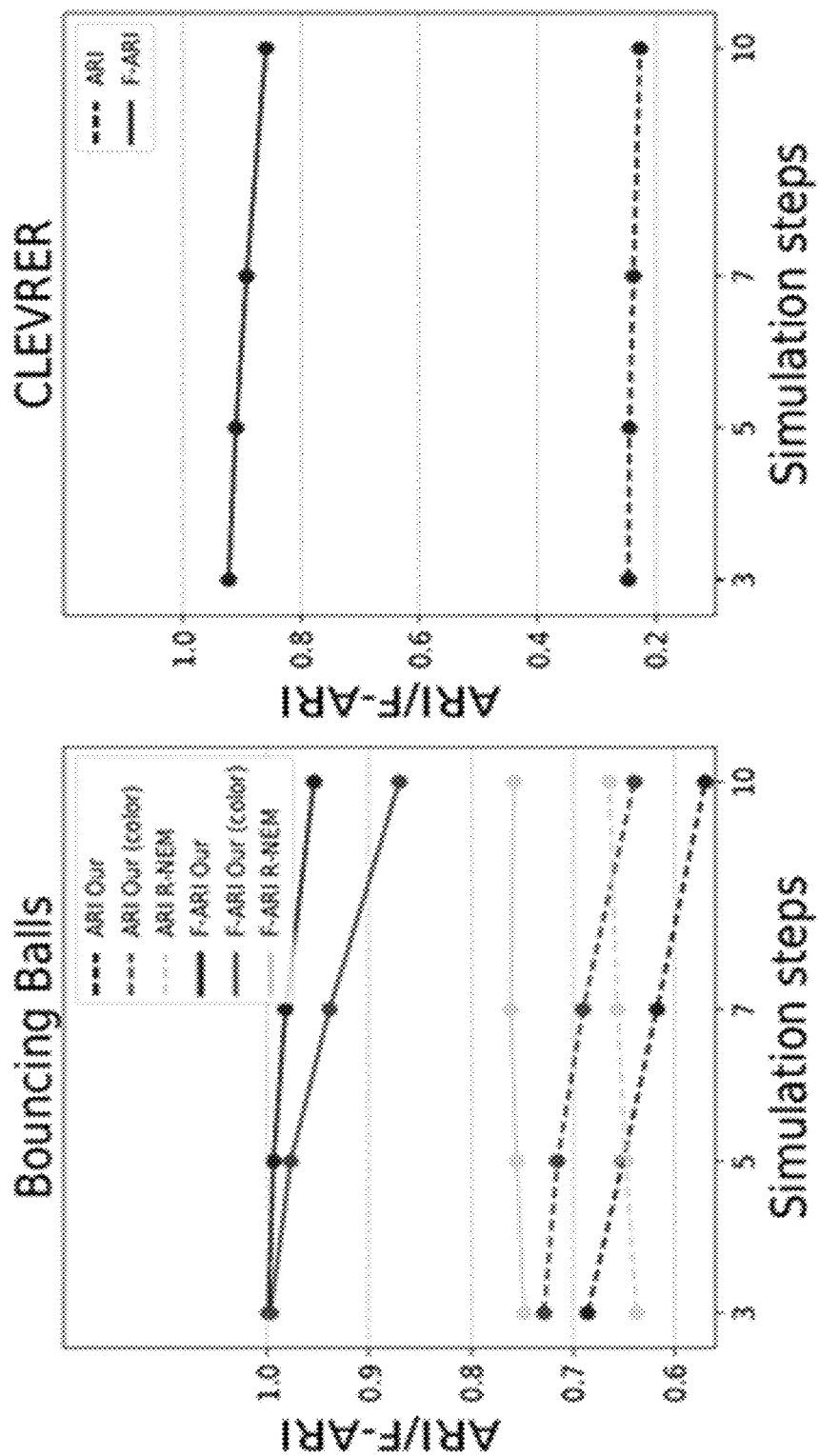
FIG. 5d shows example quantitative results for a prediction experiment.

FIG. 5d shows example quantitative results for a prediction experiment. The predictions of the model are compared to those of R-NEM after 20 steps of inference on 10 predicted steps on the Bouncing Balls dataset (FIG. 5d left). The FIG. 5d left plot shows that the model is superior to R-NEM on shorter sequences, however for the longer sequences the model is outperforming R-NEM on colored data. The model is capable of more accurate frame prediction than R-NEM on the Bouncing Balls dataset during the first few predicted frames (5-7), with predictions slowly diverging over time due to the temporal consistency. This behavior is also observable on the CLEVRER dataset (FIG. 5d right) to a lesser extent, likely because the objects' dynamics are less, even if non-linear.

Ablation

An ablation study on the entropy term, conditional prior and generation (CPG) and length of the training sequences on the binary version of the Bouncing Balls dataset can generate experiment results. Example quantitative results are shown in Table 3. The method can start by training a 2D-LSTM extension of the IODINE model on sequences of 20 frames. This example training model can very unstable and hard to optimize, the output segmentation generally lacking certainty and consistency. Modifying the 2D-LSTM network from the example of FIG. 2a while making the prior and the generation conditioned of the temporal dynamics increases the segmentation and reconstruction quality. By continuing to train this model on longer sequences of 40 frames, there was an observation of slight improvement of the scores. Finally, after adding the entropy term into the objective, the ARI score increases. This indicates that the segmentations have become more refined and precise, which is aligned with the intuition behind the entropy term: higher entropy of the masks makes them more sparse, i.e. higher level of confidence in the slot assignment.

Table 3 shows example quantitative results for an ablation study. The Base represents the base model using 2D-LSTM, the Grid represents efficient triangular grid structure (FIG. 2a), the CP+G represents conditional prior and generation, the Length represents sequence length, and the Entropy represents the entropy term (Eq. (7))

TABLE 3

Ablation Study.

|  | Base | Grid | CP + G | Entropy | Length | ARI (↑) | F-ARI (↑) | MSE (↓) |
|---|---|---|---|---|---|---|---|---|
| BB | ✓ |  |  |  | 20 | 0.0126 | 0.7765 | 0.0340 |
|  | ✓ | ✓ | ✓ |  | 20 | 0.2994 | 0.9999 | 0.0010 |
|  | ✓ | ✓ | ✓ |  | 40 | 0.3528 | 0.9998 | 0.0010 |
|  | ✓ | ✓ | ✓ | ✓ | 40 | 0.7243 | 0.9948 | 0.0004 |
| CLEVRER | ✓ |  |  |  | 20 | 0.1900 | 0.8200 | 0.0011 |
|  | ✓ | ✓ |  |  | 20 | 0.1100 | 0.9000 | 0.0005 |
|  | ✓ | ✓ | ✓ |  | 20 | 0.2403 | 0.9258 | 0.0003 |
|  | ✓ | ✓ |  |  | 40 | 0.1700 | 0.9100 | 0.0005 |
|  | ✓ | ✓ | ✓ |  | 40 | 0.2681 | 0.9312 | 0.0003 |

FIG. 1a shows an example of dynamic scene decomposition. The dynamic scene decomposition involves inference, simulation, decompositions. The dynamic scene decomposition infers precise segmentations of the objects via interpretable latent representations, that can be used to decompose each frame and simulate the future dynamics, all in an unsupervised fashion. Whenever a new object emerges into a frame, the model dynamically adapts and uses one of the segmentation slots to assign to the new object.

FIG. 1b shows another example of dynamic scene decomposition. The dynamic scene decomposition involves inference, simulation, decompositions. The dynamic scene decomposition infers precise decompositions of the objects via interpretable latent representations, that can be used to decompose each frame and simulate the future dynamics, all in an unsupervised fashion. Whenever a new object enters a frame, the model dynamically adapts and uses one of the slots to assign to the new object.

FIG. 2a shows a diagram of the model in a grid of refinement and time.

The inference in the model passes through a 2D grid data structure in which cell (r, t) represents the r-th refinement at time t. Each cell receives three inputs: a refinement hidden state $h_{t,r-1}$, a temporal hidden state $h_{t-1,\bar{R}}$, and posterior parameters $\lambda_{t,r}$. The outputs are a new hidden state $h_{t,r}$ and new posterior parameters $\lambda_{t,r+1}$.

FIG. 2b shows an example of a spatial broadcast decoder, multilayer perceptron (MLP) and long short-term memory (LSTM). The system processes the inputs to each cell with the spatial broadcast decoder and the 2D LSTM to generate the scene decomposition data.

FIG. 3 shows results of an example dataset of qualitative results on the Bouncing Balls dataset. The model can generalise to the sequences of 8 balls, while being trained on 4. The first row is the output masks, the second row is the reconstruction and the third row is the ground truth video.

FIG. 4 shows results of another example dataset of qualitative results on the CLEVRER dataset. The model can generalise the sequences of 6 objects, while being trained on 3, 4 and 5 objects. At the beginning of the sequence, only 4 objects are in the frame, however once the 5th object emerges, the model assigns one of the slots to it, and the same happens with the 6th object, and so on.

FIG. 5a and FIG. 5b show example prediction quantitative results for a prediction experiment. The prediction experiment shows the model extrapolating the motion of the objects by learning from given frames. For both datasets, the models learned the dynamics from 20 frames, and predicted 3, 5, 7 and 10 frames.

FIG. 5c shows example quantitative results for a velocity prediction experiment. This plot depicts the cosine similarity for 5 simulated frames after 10 inference steps compared to the predictions of DDPAE on the Bouncing Balls dataset.

FIG. 5d shows example quantitative results for a prediction experiment. The plots show the (F-)ARI for 3, 5, 7 and 10 simulated frames after 20 inference steps. The left plot shows predictions of the model compared to those of R-NEM on the Bouncing Balls dataset, and the right plot shows the predictions on the CLEVRER dataset.

Figure 6:
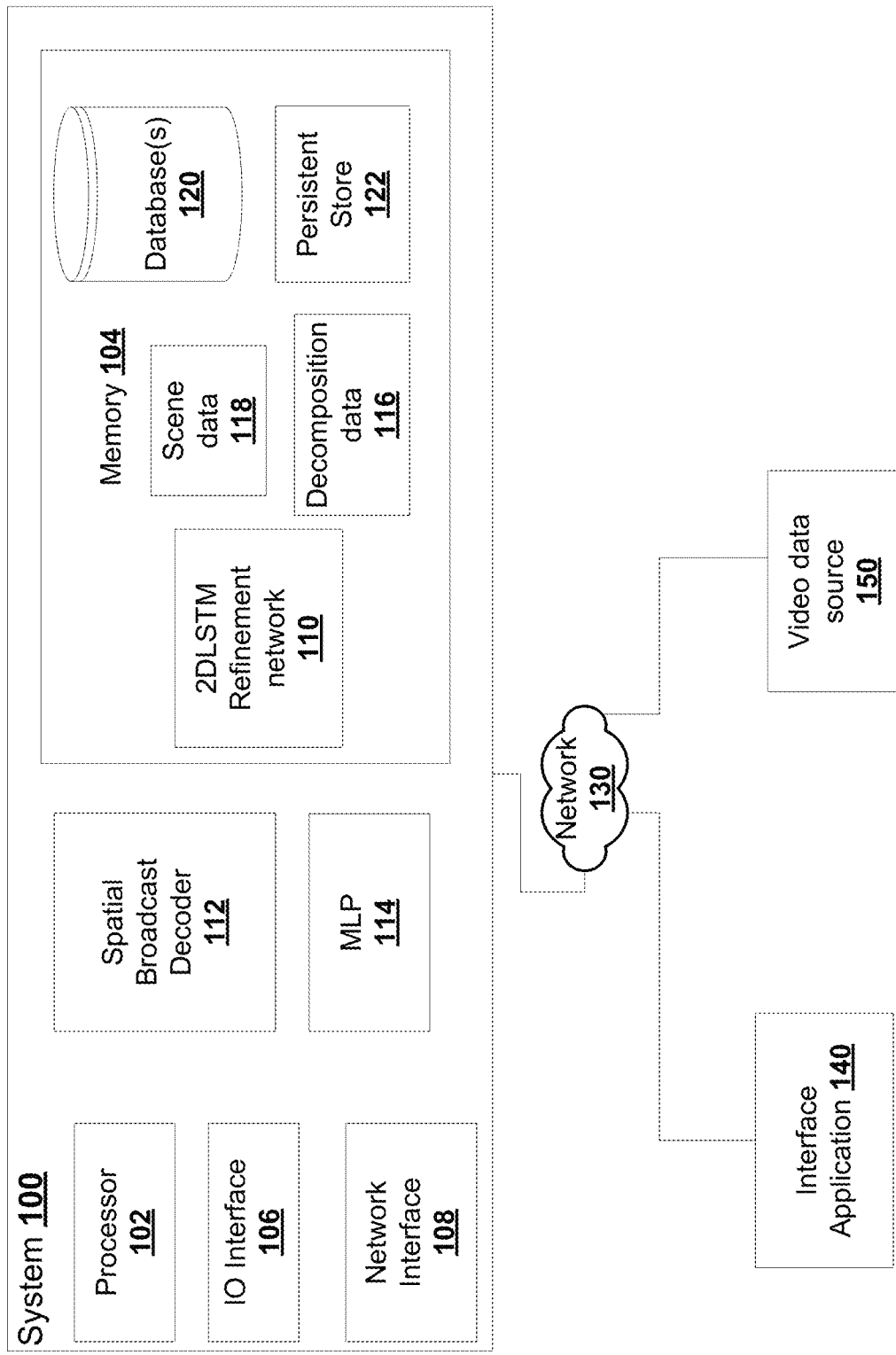
FIG. 6 shows a system for multi-object video decomposition.

FIG. 6 is a schematic diagram of system 100 for unsupervised multi-object video decomposition with at least one computing device exemplary of an embodiment. As depicted, system 100 includes at least one processor 102, memory 104, at least one I/O interface 106, and at least one network interface 108. The system also has a spatial broadcast decoder 112, multilayer perceptron (MLP) 114, and a long short-term memory unit (2DLSTM Refinement network 110). The system 100 processes scene data 118 to generate scene decomposition data 116. The system 100 processes the inputs to each cell with the spatial broadcast decoder 112 and the 2DLSTM Refinement network 110. The system 100 receives scene data 118, such as raw video data, from video data sources 150, for example. The system 100 can be configured using an interface application 140, to update model parameters, for example.

The memory 104 can store models as described herein. The processor 102 can access the models stored in the memory 104 to process the scene data 118 to generate the scene decomposition data 116. The memory 104 can store a spatio-temporal amortized inference model for multi-object video decomposition, for example. The processor 102 accesses the memory 104 to process the scene data 118, using the spatio-temporal amortized inference model to generate scene decomposition data 116.

The processor 102 can decompose a video sequence into slot sequences and appearance sequences and introduces temporal dependencies into the sequence of posterior refinements for use during decoding with a generative model (of system 100, or another system).

The processor 102 can generate a graph with a time dimension and a refinement dimension for the scene data 118 using the spatio-temporal amortized inference model and a 2D long short term memory unit 110 to capture a joint probability over a video sequence.

The processor 102 can generate variational estimates from previous refinement steps and temporal information from previous frames of the scene data 118. The processor can use the temporal information for object segmentation.

The processor 102 can train the model using a variational objective having a first term for a reconstruction error of a single frame and a second term for a divergence between a variational posterior and a prior. There can be a relative weight between both terms, controlled with a hyperparameter.

The processor 102 can decompose a static scene into multiple objects and represents each object by a latent vector capturing the object's unique appearance to encode common visual properties. For each latent vector, a broadcast decoder 112 generates pixelwise pairs of assignment probability and appearance of a pixel for an object. The pixelwise pairs induce a generative image formation model. Original image pixels can be reconstructed from a probabilistic representation of the image formation model.

The processor 102 can generate a parameter estimate for an approximate posterior and updates the parameter estimate over a series of refinement steps. Each refinement step samples a latent representation from the approximate posterior to evaluate an ELBO and uses gradients for the approximate posterior to compute the updated parameter estimate.

The processor 102 can generate a parameter estimate using a function of a sequence of convolutional layers and a 2D long short term memory unit 110. The 2D long short term memory unit 110 can take as input a hidden state from a previous refinement step. In some embodiments, the scene data 118 comprises disentangled, spatially granular representations of objects. The processor 102 can generate, for the objects, scene inference data, segmentation data, and prediction data by processing the scene data 118.

The scene data 118 can be complex visual scenes consisting of multiple moving object instances and the processor 102 can use the spatio-temporal amortized inference model to decouple object appearance and shape.

The scene data 118 can be complex video data depicting multiple objects. The processor 102 can use the spatio-temporal amortized inference model to generate, for each of the multiple objects, object inference data, object segmentation data, and object prediction data.

The scene decomposition data 116 can be scene inference data, segmentation data, and prediction data for objects of the scene data 118.

The spatio-temporal amortized inference model can capture refinement of an object over time and can be used to generate refinement data over time. The spatio-temporal amortized inference model can capture temporal dependencies between latent variables of the scene data across time. The scene data 118 can be video data and the spatio-temporal amortized inference model captures temporal dependencies among frames in the video data, for example. The spatio-temporal amortized inference model has a conditional prior for variational inference. The spatio-temporal amortized inference model can use unsupervised learning for multi-object scene decomposition to learn probabilistic dynamics of each object from complex raw video data by introducing temporal dependencies between the random latent variables at each frame.

The scene decomposition data 116 includes segmentation data defining segmentation of objects within the scene data.

The processor 102 can infer the segmentation data of objects using interpretable latent representations to decompose each frame of the scene data and simulate future dynamics using an unsupervised process.

In some embodiments, the memory 104 stores the additional entropy prior and the processor 102 accesses the memory 104 to process the scene data 118, using the additional entropy prior when object appearance is non-distinctive.

In some embodiments, the memory 104 stores the additional entropy prior and the processor 102 accesses the memory 104 to use the model to estimate masks and dynamics of each object in the scene data 118 and temporal dependencies between frames of the scene data 118.

The spatio-temporal amortized inference model can be provided by the 2D long short term memory refinement network 110.

The system 100 provides for unsupervised multi-object video decomposition. The memory 104 receives and stores scene data and a spatio-temporal amortized inference model for unsupervised video decomposition. The hardware processor 102 accesses the memory 104 to process the scene data using the spatio-temporal amortized inference model to generate scene decomposition data.

The spatio-temporal amortized inference model has instructions for refinement steps and time steps and a grid of cells. An example illustration of the grid of cells with refinement steps and time steps is shown in FIG. 2a. The cells have a first set of cells (e.g. light gray) and a second set of cells (e.g. dark grey). Each cell (r, t) of the first set of cells corresponds an r-th refinement at time t. Each cell of the second set of cells corresponds to a final construction with no refinement needed. Each cell of the first set of cells (e.g. light gray) receives as input a previous refinement hidden state, a temporal hidden state, and posterior parameters, and generates as output a new hidden state and new posterior parameters. Different input X1 . . . Xt is shown in the example of FIG. 2a.

Each cell of the first set of cells can be implemented by a spatial broadcast decoder 112, a multilayer perceptron 114 and a 2D long short term memory unit 110. An example configuration for t=2 is shown in FIG. 2b, which illustrates a cell for processing input X2 to generate output. Accordingly, there can be multiple spatial broadcast decoders 112, multilayer perceptrons 114 and 2D long short term memory units 110 in the system 100 of FIG. 6.

The processor 102 decomposes a video sequence into slot sequences and appearance sequences and introduces temporal dependencies into a sequence of posterior refinements for use during decoding with a generative model.

The processor 102 generates scene decomposition data having a graph or grid with a time dimension and a refinement dimension for the scene data. An example grid is shown in FIG. 2a. The processor 102 generates scene decomposition data using the spatio-temporal amortized inference model and a 2D long short term memory unit 110 to capture a joint probability over a video sequence of the scene data. In some embodiments, the spatio-temporal amortized inference model jointly models multi object representations and temporal dependencies between latent variables across frames of the scene data.

The processor 102 generates scene decomposition data uses scene decomposition data to encode information about objects' dynamics, and predict trajectories of each object separately.

The scene decomposition data provides multi-object representations to decompose a scene into a collection of objects with individual representations. In the data, each object can be represented by a latent vector capturing the object's unique appearance and encoding visual properties comprising color, shape, position, and size. A broadcast decoder 112 generates pixelwise pairs corresponding to an assignment probability and appearance of a pixel for the object. The processor 102 induces a generative image formation model to construct image pixels.

The processor 102 uses the spatio-temporal amortized inference model by starting with estimated parameters for an approximate posterior and update the estimated parameters by a series of refinement operations. Each refinement operation samples a latent representation and uses an approximate posterior gradient to compute a new parameter estimate using a sequence of convolutional layers and a long short term memory unit 110 that receives as input a hidden state from a previous refinement operation.

The processor 102 generates variational estimates from previous refinement steps and temporal information from previous frames of the scene data.

The processor 102 processor trains the model using a variational objective having a first term for a reconstruction error of a single frame and a second term for a divergence between a variational posterior and a prior. A relative weight between both terms is controlled with a hyperparameter.

The processor 102 decomposes a static scene into multiple objects and represents each object by a latent vector capturing the object's unique appearance to encode visual properties, wherein, for each latent vector. A broadcast decoder 112 generates pixelwise pairs of assignment probability and appearance of a pixel for an object. The pixelwise pairs induce a generative image formation model. The original image pixels can be reconstructed from a probabilistic representation of the image formation model.

The processor 102 generates a parameter estimate for an approximate posterior and updates the parameter estimate over a series of refinement steps. Each refinement step samples a latent representation from the approximate posterior to evaluate an ELBO and uses gradients for the approximate posterior to compute the updated parameter estimate.

The processor 102 processor generates a parameter estimate, using a function of a sequence of convolutional layers and an long short term memory unit 110. The long short term memory unit 110 takes as input a hidden state from a previous refinement step.

The scene data includes disentangled, spatially granular representations of objects and wherein the processor generates, for the objects, scene inference data, segmentation data, and prediction data by processing the scene data. The scene data has complex visual scenes consisting of multiple moving object instances. The processor 102 uses the spatio-temporal amortized inference model to decouple object appearance and shape. The processor 102 uses the spatio-temporal amortized inference model to generate, for each of the multiple objects, object inference data, object segmentation data, and object prediction data.

The scene decomposition data has scene inference data, segmentation data, and prediction data for objects of the scene data. The spatio-temporal amortized inference model captures refinement of an object over time.

The spatio-temporal amortized inference model captures temporal dependencies between latent variables of the scene data across time. The scene data has video data, and the spatio-temporal amortized inference model captures temporal dependencies among frames in the video data. The spatio-temporal amortized inference model has a conditional prior for variational inference.

The scene decomposition data has segmentation data defining segmentation of objects within the scene data. The processor 102 infers the segmentation data of objects using interpretable latent representations to decompose each frame of the scene data and simulate future dynamics using an unsupervised process.

The spatio-temporal amortized inference model uses unsupervised learning for multi-object scene decomposition to learn probabilistic dynamics of each object from complex raw video data by introducing temporal dependencies between the random latent variables at each frame. The memory 104 stores the additional entropy prior and the processor 102 accesses the memory 104 to process the scene data using the additional entropy prior when object appearance is non-distinctive.

The processor 102 uses the model to estimate masks and dynamics of each object in the scene data and temporal dependencies between frames of the scene data.

As shown in the example of FIG. 6, the system 100 can have a spatial broadcast decoder 112, multilayer perceptron 114 and long short-term memory 110 to implement aspects of embodiments described herein. The spatio-temporal amortized inference model has a refinement network. The processor 102 uses the model to simulate future frames of the scene data, which can be provided as output.

Each processor 102 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 104 may include a suitable combination of any type of computer memory that is located either internally or externally.

Each I/O interface 106 enables system 100 to interconnect with one or more input devices, such as a keyboard, mouse, camera, touch screen and a microphone, or with one or more output devices such as a display screen and a speaker.

Each network interface 108 enables the system 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The system 100 is operable to register and authenticate users (using a login, unique identifier, and password, for example) prior to providing access via interface application 140.

Figure 7:
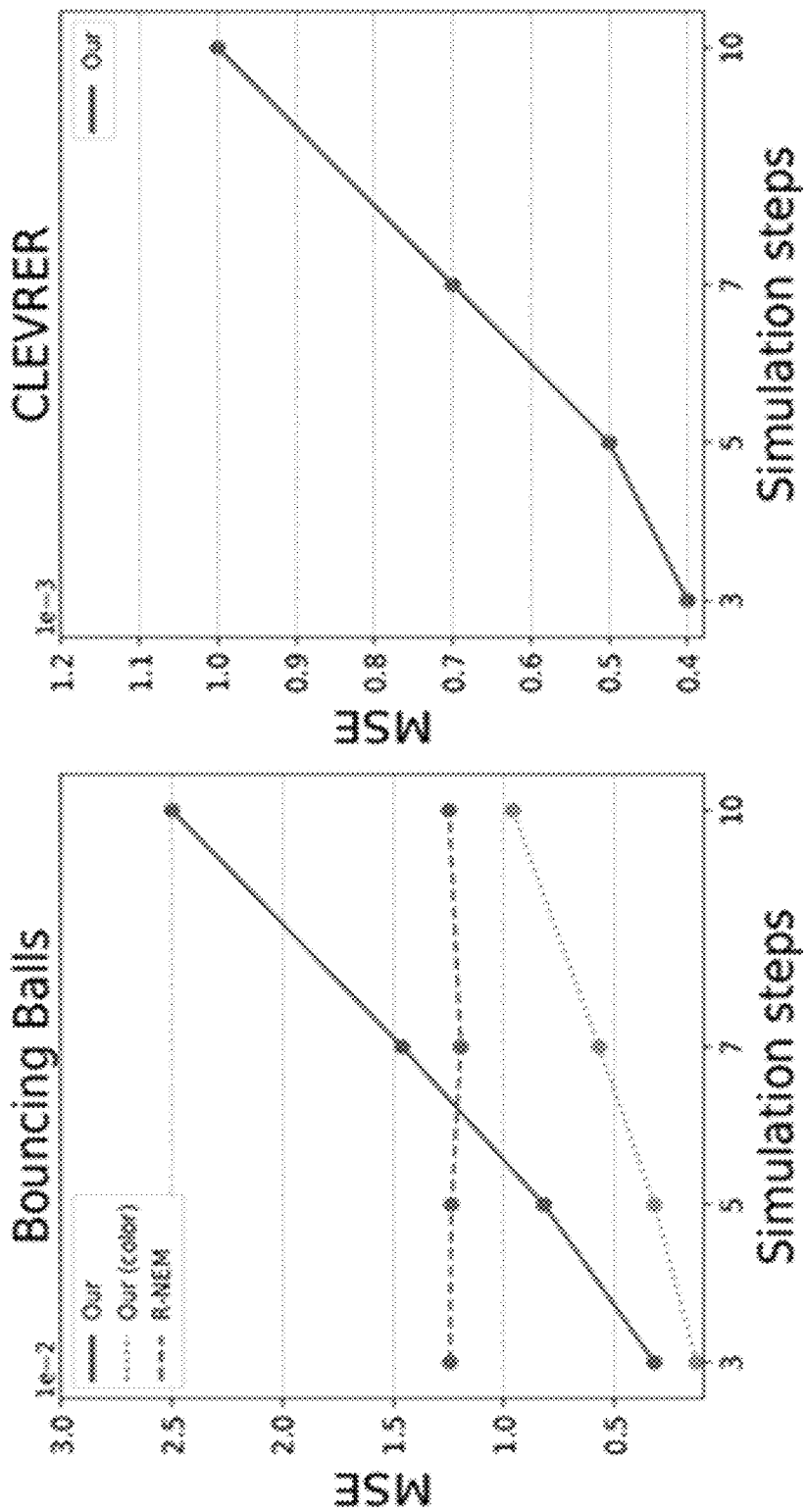
FIG. 7 shows example results of mean squared error for a prediction experiment.

FIG. 7 shows example results of mean squared error (MSE) for a prediction experiment. The MSE was computed for the same experimental set up as in FIG. 5d. As expected, the MSE increases with the number of simulation steps. Similarly to ARI and F-ARI scores, the model outperforms R-NEM on the first steps of simulation, however the error function of the model grows faster comparatively to R-NEM and diverges sooner from the accurate simulation.

Figure 8:
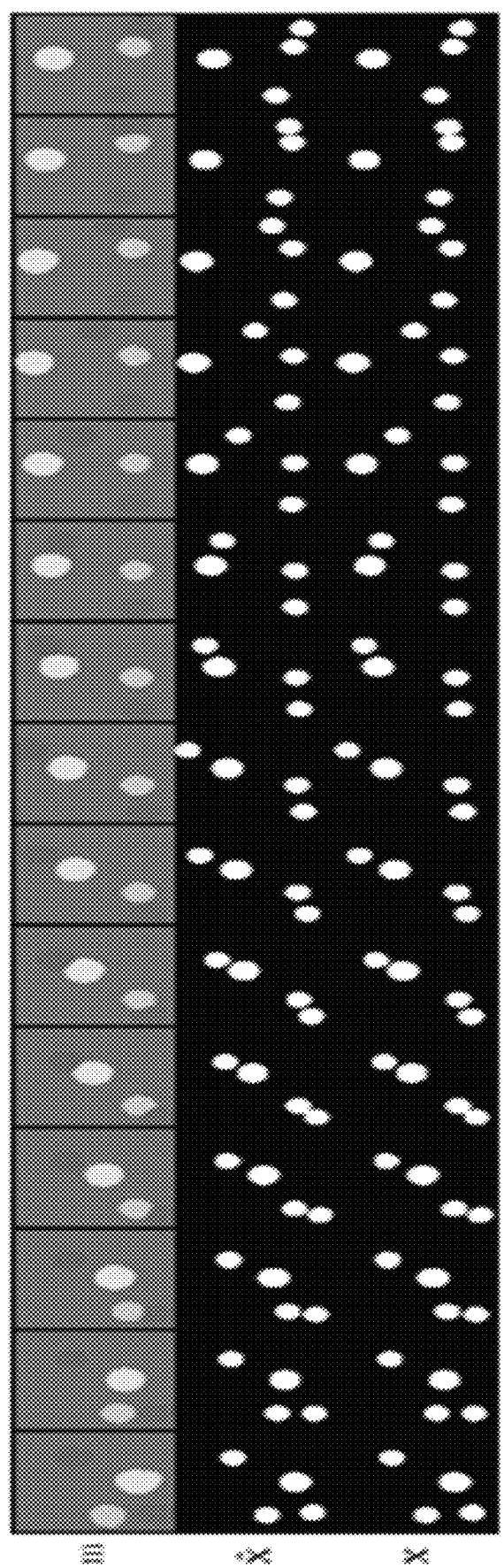
FIG. 8 shows example results for an example dataset.

FIG. 8 shows example results for an example dataset. In this example video decomposition, the model was applied on the Bouncing Balls dataset with 4 balls.

Figure 9:
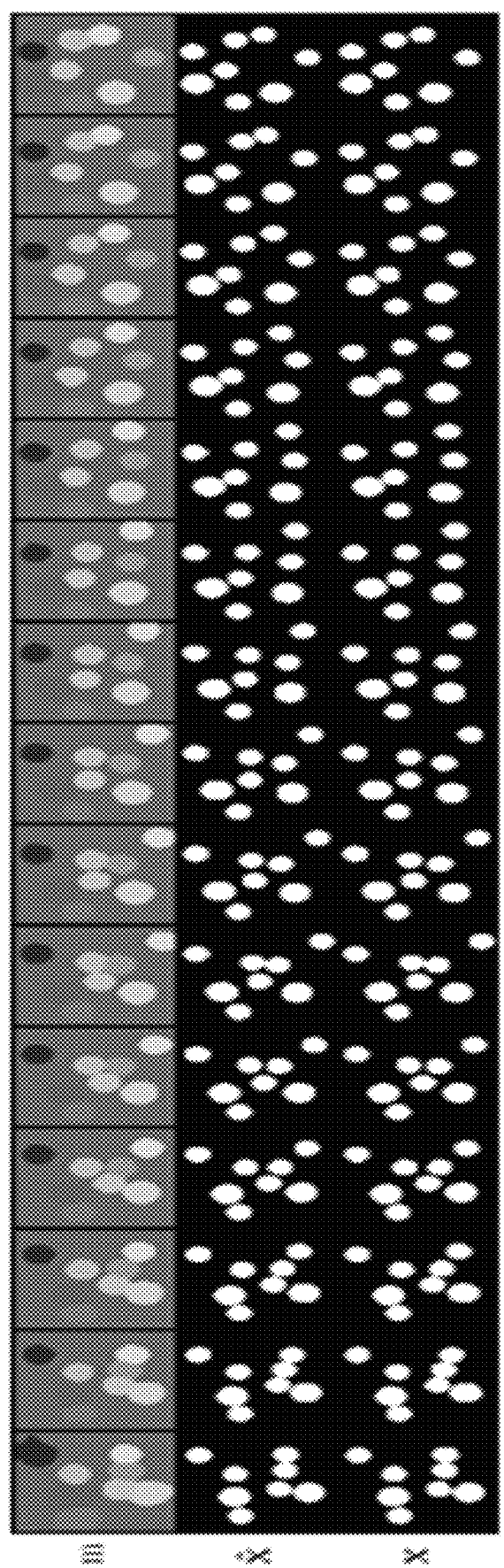
FIG. 9 shows example results for another example dataset.

FIG. 9 shows example results for another example dataset. In this example video decomposition, the model was applied on the Bouncing Balls dataset with 6 to 8 balls.

Figure 10:
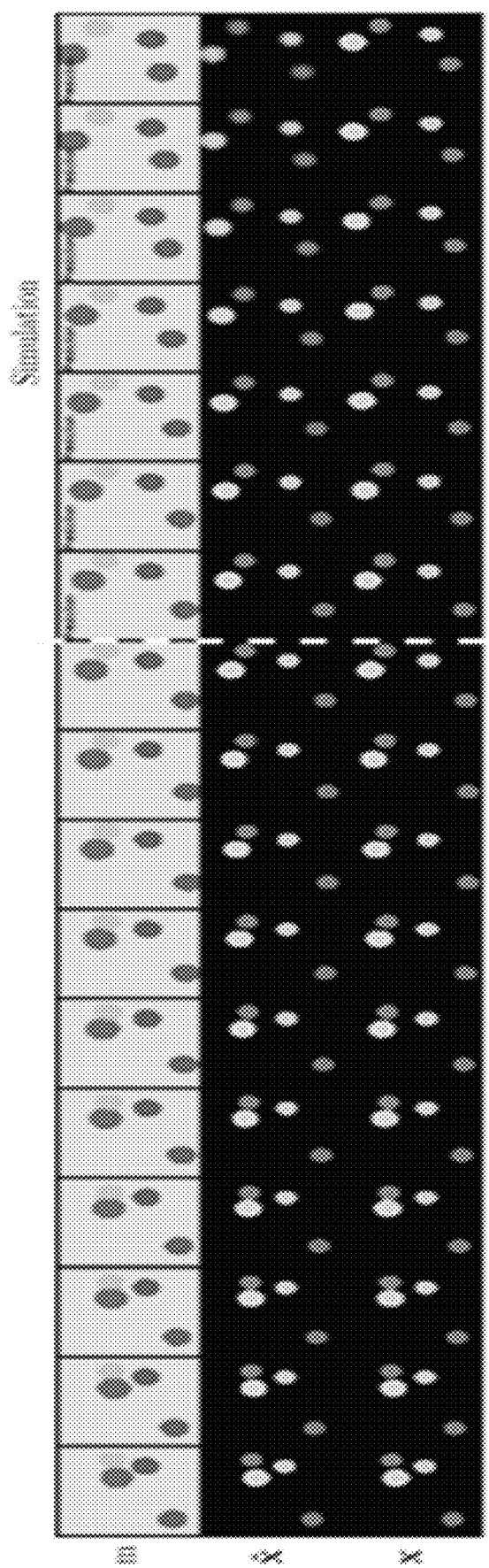
FIG. 10 shows example qualitative results for a prediction experiment using an example dataset.

FIG. 10 shows example qualitative results for a prediction experiment using an example dataset. In this example prediction experiment, the prediction was done on the Bouncing Balls (colored) dataset.

Figure 11:
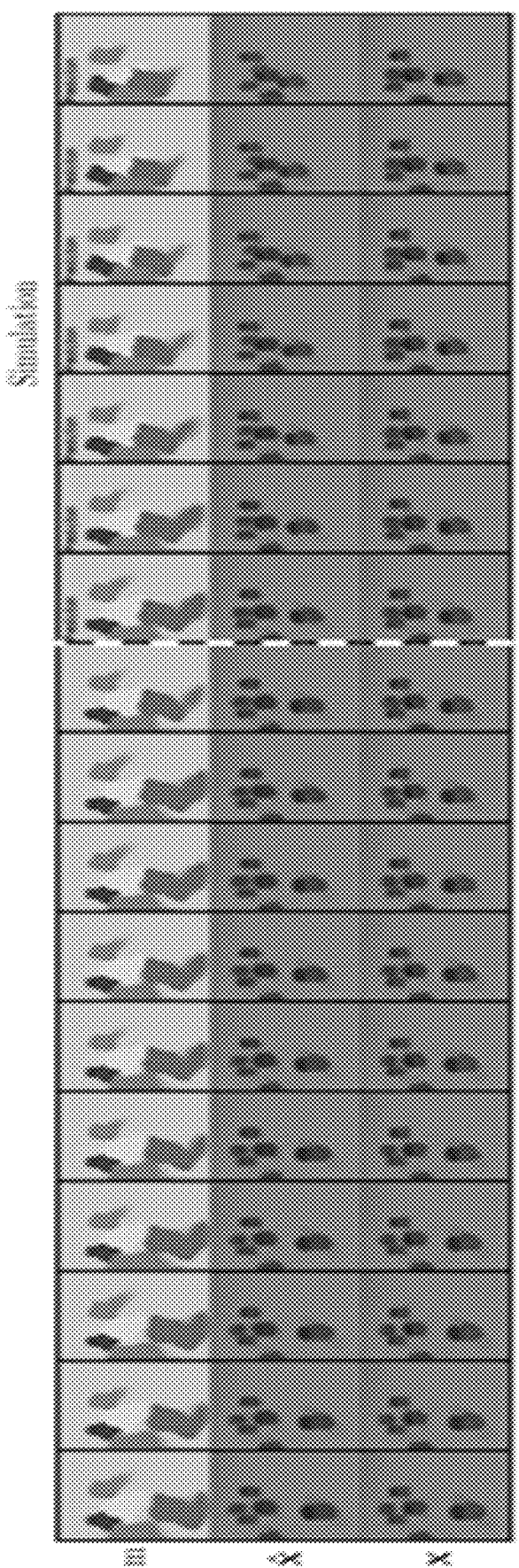
FIG. 11 shows example qualitative results for a prediction experiment using another example dataset.

FIG. 11 shows example qualitative results for a prediction experiment using another example dataset. In this example prediction experiment, the prediction was done on the CLEVRER dataset.

Figure 12A:
FIG. 12a and FIG. 12b show example benchmark results for decomposition experiment.
Figure 12B:

FIG. 12$a$ and FIG. 12$b$ show example benchmark results for a decomposition experiment. The figures show the qualitative results for an example models. IODINE vs. SEQ-IODINE decomposition experiment. FIG. 12$a$ shows that the model can much sooner detect new objects emerging to the frame, while SEQ-IODINE struggles to properly reconstruct and decompose them and IODINE does not have any temporal consistence and reshuffles the slot order. FIG. 12$b$ shows that the model is much more stable with time and does not fail to detect objects, unlike IODINE and SEQ-IODINE.

Figure 13:
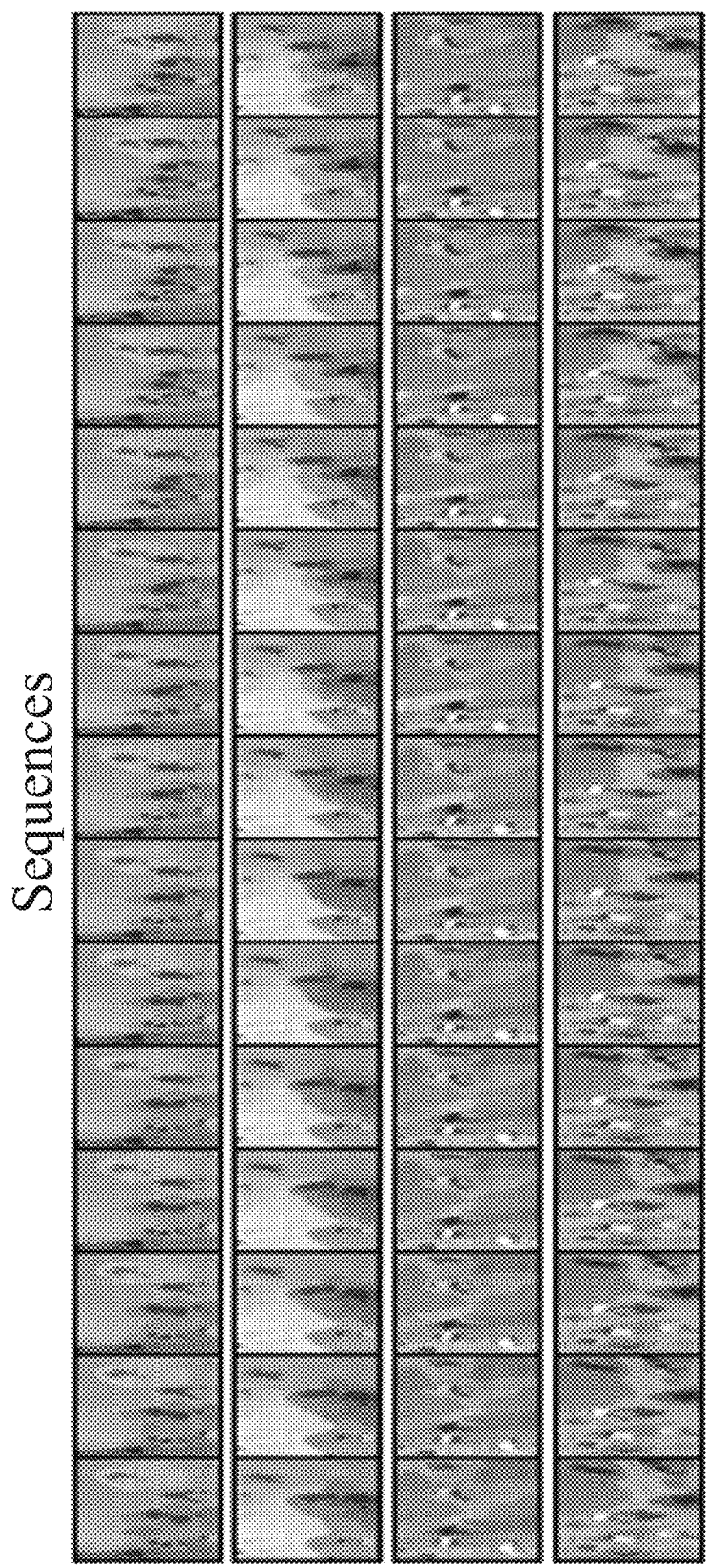
FIG. 13 shows example qualitative results for an experiment using another example dataset.

FIG. 13 shows example qualitative results for an experiment using another example dataset. This figure shows the qualitative evaluation on example real-world data of the Grand Central Station. As depicted, the model is consistent in separating the image regions belonging to different objects as they move in the scene. This dataset is particularly challenging due to its background texture, complex lighting and shadows.

Figure 14:
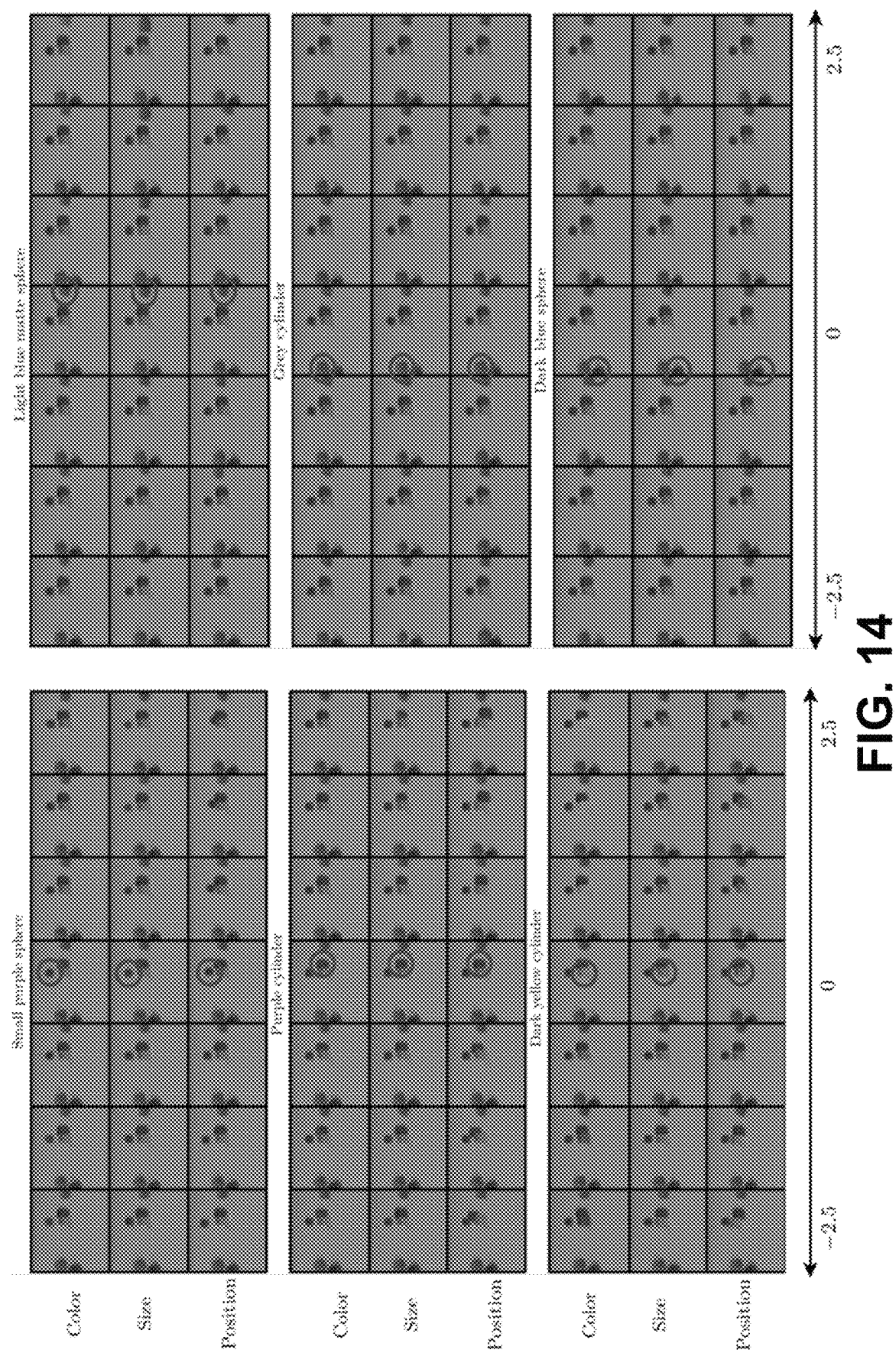
FIG. 14 shows example results for a new temporal hidden state and an additional MLP in front of a spatial broadcast decoder.

FIG. 14 shows example results for a new temporal hidden state and an additional MLP in front of a spatial broadcast decoder. This figure shows the disentanglement of the latent representations corresponding to distinct interpretable features. The CLEVRER latent walks along three different dimensions: colors, size, and position. A random frame was chosen and for each object's representation in the scene, dimensions were traversed independently.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In other embodiments, there may be a combination of communication interfaces implemented as hardware, software, and combination thereof.

Throughout discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer-readable, tangible, non-transitory medium. For example, a server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For simplicity, only one system 100 is shown, but there may be distributed systems 100 to access network resources and exchange data. The computing device components may be connected in various ways including directly coupled, indirectly coupled via a network, and distributed over a wide geographic area and connected via a network (which may be referred to as "cloud computing").

For example, and without limitation, the computing device may be a server, network appliance, embedded device, computer expansion module, or other computing device capable of being configured to carry out the methods described herein Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only.

What is claimed is:

1. A system for unsupervised multi-object video decomposition comprising:
    a memory storing a video sequence of scene data over time and a spatio-temporal amortized inference model for unsupervised multi-object video decomposition, wherein the scene data comprises a plurality of objects and three-dimensional information about the plurality of objects over the time, wherein the memory stores an additional entropy prior; and
    a hardware processor that accesses the memory to process the scene data using the spatio-temporal amortized inference model for machine learning of probabilistic dynamics and temporal extrapolation to predict a plurality of future trajectories of each object of the plurality of objects by introducing temporal dependencies between latent variables at each frame of the video sequence of the scene data to generate scene decomposition data, wherein the scene decomposition data provides multi-object representations to decompose the scene data into a collection of the plurality of objects with individual representations, wherein the hardware processor represents each object of the plurality of objects as a latent vector encoding object properties over the time, the object properties capturing the respective object's appearance with visual properties of color, shape, position, and size, wherein the hardware processor decomposes the video sequence of the scene data into slot sequences and appearance sequences over the time to introduce the temporal dependencies into a sequence of posterior refinements, wherein the scene decomposition data has time data and refinement data for use during decoding with a generative model, wherein the spatio-temporal amortized inference model comprises a conditional prior for variational inference and temporal conditioning that only changes over time and is independent of the sequence of posterior refinements, wherein the hardware processor accesses the memory to process the scene data using the additional entropy prior to improve performance when object appearance is non-distinctive.

2. The system of claim 1 wherein the spatio-temporal amortized inference model comprises instructions for refinement steps and time steps and a grid of cells, the grid of cells having a first set of cells and a second set of cells, wherein each cell (r, t) of the first set of cells corresponds to an r-th refinement at time t, wherein each cell of the second set of cells corresponds to a final construction with no refinement needed, wherein each cell of the first set of cells receives as input a previous refinement hidden state, a temporal hidden state, and posterior parameters, and generates as output a new hidden state and new posterior parameters.

3. The system of claim 2 wherein each cell of the first set of cells comprises a spatial broadcast decoder, a multilayer perceptron and a 2D long short term memory unit.

4. The system of claim 1 wherein the hardware processor introduces the temporal dependencies into the sequence of posterior refinements for use during decoding with the generative model.

5. The system of claim 1 wherein the hardware processor generates scene decomposition data comprising a graph or grid with a time dimension and a refinement dimension for the scene data using the spatio-temporal amortized inference model and a 2D long short term memory unit to capture a joint probability over a video sequence of the scene data.

6. The system of claim 1 wherein the spatio-temporal amortized inference model jointly models multi object representations and temporal dependencies between latent variables across frames of the scene data.

7. The system of claim 1 wherein the hardware processor uses scene decomposition data to encode information about objects' dynamics, and predict trajectories of each object separately.

8. The system of claim 1 wherein the scene decomposition data provides multi-object representations to decompose a scene into a collection of objects with individual representations, wherein each object of the collection of objects is represented by a latent vector capturing the object's unique appearance and encoding visual properties comprising color, shape, position, and size, wherein a broadcast decoder generates pixelwise pairs corresponding to an assignment probability and appearance of a pixel for the respective object of the collection of objects, wherein the hardware processor induces a generative image formation model to construct image pixels.

9. The system of claim 1 wherein the hardware processor uses the spatio-temporal amortized inference model by starting with estimated parameters for an approximate posterior and updates the estimated parameters by a series of refinement operations, wherein each refinement operation of the series of refinement operations samples a latent representation and uses an approximate posterior gradient to compute a new parameter estimate using a sequence of convolutional layers and a long short term memory unit that receives as input a hidden state from a previous refinement operation.

10. The system of claim 1 wherein the hardware processor generates variational estimates from previous refinement steps and temporal information from previous frames of the scene data.

11. The system of claim 1 wherein the hardware processor trains the spatio-temporal amortized inference model using a variational objective having a first term for a reconstruction error of a single frame and a second term for a divergence between a variational posterior and a prior, wherein a relative weight between the first and second terms is controlled with a hyperparameter.

12. The system of claim 1 wherein the hardware processor decomposes a static scene into multiple objects and represents each object of the multiple objects by a latent vector capturing the object's unique appearance to encode visual properties, wherein, for each latent vector, a broadcast decoder generates pixelwise pairs of assignment probability and appearance of a pixel for an object, wherein the pixelwise pairs induce a generative image formation model, wherein original image pixels can be reconstructed from a probabilistic representation of the generative image formation model.

13. The system of claim 1 wherein the hardware processor generates a parameter estimate for an approximate posterior and updates the parameter estimate over a series of refinement steps, wherein each refinement step of the series of refinement steps samples a latent representation from the approximate posterior to evaluate an evidence of lower bound (ELBO) and uses gradients for the approximate posterior to compute the updated parameter estimate.

14. The system of claim 1 wherein the hardware processor generates a parameter estimate, using a function of a sequence of convolutional layers and a long short term memory unit, wherein the long short term memory unit takes as input a hidden state from a previous refinement step.

15. The system of claim 1 wherein the scene data comprises disentangled, spatially granular representations of the plurality of objects and wherein the hardware processor generates, for the plurality of objects, scene inference data, segmentation data, and prediction data by processing the scene data.

16. The system of claim 1 wherein the scene data comprises complex visual scenes consisting of multiple moving object instances, wherein the hardware processor uses the spatio-temporal amortized inference model to decouple object appearance and shape.

17. The system of claim 1 wherein the hardware processor uses the spatio-temporal amortized inference model to generate, for each object of the plurality of objects, object inference data, object segmentation data, and object prediction data.

18. The system of claim 1, wherein the scene decomposition data comprises scene inference data, segmentation data, and prediction data for objects of the scene data.

19. The system of claim 1, wherein the spatio-temporal amortized inference model captures refinement of an object over time.

20. The system of claim 1, wherein the spatio-temporal amortized inference model captures temporal dependencies between latent variables of the scene data across time.

21. The system of claim 1, wherein the scene data comprises video data, wherein the spatio-temporal amortized inference model captures temporal dependencies among frames in the video data.

22. The system of claim 1, wherein the scene decomposition data comprises segmentation data defining segmentation of objects within the scene data, and wherein the hardware processor infers the segmentation data of objects using interpretable latent representations to decompose each frame of the scene data and simulate future dynamics using an unsupervised process.

23. The system of claim 1, wherein the spatio-temporal amortized inference model uses unsupervised learning for multi-object scene decomposition to learn probabilistic dynamics of each object from complex raw video data by introducing temporal dependencies between latent variables at each frame of the scene data.

24. The system of claim 1, wherein the hardware processor uses the spatio-temporal amortized inference model to estimate masks and dynamics of each object in the scene data and temporal dependencies between frames of the scene data.

25. The system of claim 1 comprising a spatial broadcast decoder, multilayer perceptron and long short-term memory.

26. The system of claim 1 wherein the spatio-temporal amortized inference model comprises a refinement network.

27. The system of claim 1 wherein the hardware processor uses the spatio-temporal amortized inference model to simulate future frames of the scene data.

28. A method for unsupervised multi-object video decomposition comprising:
decomposing a video sequence of scene data into slot sequences and appearance sequences to introduce temporal dependencies into a sequence of posterior refinements, wherein the scene data comprises a plurality of objects and three-dimensional information about the plurality of objects over time; and
generating scene decomposition data using a processor that accesses memory storing a spatio-temporal amortized inference model for machine learning of probabilistic dynamics and temporal extrapolation to predict a plurality of future trajectories of each object of the plurality of objects by introducing temporal dependencies between latent variables at each frame of the video sequence of the scene data and having a 2D long short term memory unit to capture a joint probability over the video sequence, wherein each object of the plurality of objects is represented as a latent vector encoding object properties over the time, the object properties capturing the respective object's appearance with visual properties of color, shape, position, and size, wherein the scene decomposition data provides multi-object representations to decompose the scene data into a collection of the plurality of objects with individual representations, the scene decomposition data having time data and refinement data for use during decoding with a generative model, wherein the spatio-temporal amortized inference model comprises a conditional prior for variational inference and temporal conditioning that only changes over time and is independent of the sequence of posterior refinements, wherein the processor accesses the memory to process the scene data using an additional entropy prior to improve performance when object appearance is non-distinctive.

* * * * *